US011520613B2

(12) United States Patent
Celozzi et al.

(10) Patent No.: US 11,520,613 B2
(45) Date of Patent: Dec. 6, 2022

(54) DYNAMIC FLAVOR ALLOCATION

(71) Applicant: Telefonaktiebolaget LM Ericsson (publ), Stockholm (SE)

(72) Inventors: Giuseppe Celozzi, Naples (IT); Luca Baldini, Rome (IT); Daniele Gaito, Naples (IT); Gaetano Patria, San Prisco (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 258 days.

(21) Appl. No.: 16/616,800

(22) PCT Filed: Jun. 2, 2017

(86) PCT No.: PCT/EP2017/063586
§ 371 (c)(1),
(2) Date: Nov. 25, 2019

(87) PCT Pub. No.: WO2018/219479
PCT Pub. Date: Dec. 6, 2018

(65) Prior Publication Data
US 2021/0149699 A1 May 20, 2021

(51) Int. Cl.
*G06F 9/46* (2006.01)
*G06F 9/455* (2018.01)
(Continued)

(52) U.S. Cl.
CPC ........ *G06F 9/45558* (2013.01); *G06F 9/5027* (2013.01); *G06F 9/5077* (2013.01);
(Continued)

(58) Field of Classification Search
CPC .. G06F 9/45558; G06F 9/5027; G06F 9/5077; G06F 11/076; G06F 11/1784
See application file for complete search history.

(56) References Cited

U.S. PATENT DOCUMENTS

| | | | | |
|---|---|---|---|---|
| 2006/0002312 A1* | 1/2006 | Delattre | ............... | H04W 40/28 370/254 |
| 2015/0256621 A1* | 9/2015 | Noda | .................... | G06F 3/0644 709/226 |
| 2015/0339302 A1* | 11/2015 | Dwarampudi | ...... | G06F 11/1464 707/667 |

FOREIGN PATENT DOCUMENTS

EP 2 849 064 A1 3/2015

OTHER PUBLICATIONS

ETSI GS NFV-MAN 001 v1.1.1; Group Specification; Network Functions Virtualisation (NFV); Management and Orchestration—Dec. 2014.

(Continued)

*Primary Examiner* — Camquy Truong
(74) *Attorney, Agent, or Firm* — Baker Botts, LLP

(57) ABSTRACT

A method for allocating a plurality of virtual machines (51-55) provided on at least one host (11-15) to a virtualized network function is provided, which provides a defined functional behavior in a network and requires a total application capacity for the functional behavior, the functional behavior being provided by needed virtual machines from the plurality of virtual machines, wherein each of the at least one host has an available processing capacity which can be assigned to the virtual machines provided on the corresponding host, and each virtual machine has at least one flavor which indicates a used processing capacity of the available processing capacity of the corresponding host and which corresponds to a partial application capacity of the total application capacity provided by the corresponding virtual machine, the method comprising: —determining the total application capacity of the virtualized network function, —determining, for each of the virtual machines, the at least one flavor taking into account the available processing capacity of the host on which the corresponding virtual machine is provided, and the corresponding at least one partial application capacity, —determining the needed virtual machines from the plurality of virtual machines and needed flavors of the needed virtual machines that are required to provide the total application capacity, wherein determining the needed virtual machines and needed flavors comprises: performing an iterative process in which the needed virtual machines are dynamically determined from the plurality of virtual machines based on the total application capacity, and in which the needed flavor for each of the (Continued)

| ID | Name | Memory MB | Disk | Ephemeral | Swap | vCPUs | RXTX Factor | isPublic | Capacity |
|---|---|---|---|---|---|---|---|---|---|
| 1 | M1.tiny | 512 | 1 | 0 | | 1 | 1.0 | True | 50 |
| 2 | M1.small | 2048 | 20 | 0 | | 1 | 1.0 | True | 200 |
| 3 | M1.medium | 4096 | 40 | 0 | | 2 | 1.0 | True | 400 |
| 4 | M1.large | 8192 | 80 | 0 | | 4 | 1.0 | True | 800 |
| 5 | M1.xlarge | 16384 | 160 | 0 | | 8 | 1.0 | True | 1000 | needed virtual machines is dynamically determined taking into account the total application capacity and the available processing capacity provided on the host on which the corresponding needed virtual machine is provided.

25 Claims, 10 Drawing Sheets

(51) Int. Cl.
  *G06F 9/50* (2006.01)
  *G06F 11/07* (2006.01)
  *G06F 11/14* (2006.01)
(52) U.S. Cl.
  CPC ........ *G06F 11/076* (2013.01); *G06F 11/1484* (2013.01); *G06F 2009/45583* (2013.01); *G06F 2009/45591* (2013.01); *G06F 2009/45595* (2013.01)

(56) References Cited

OTHER PUBLICATIONS

PCT International Search Report for International application No. PCT/EP2017/063586—dated Feb. 19, 2018.
PCT Written Opinion of the International Searching Authority for International application No. PCT/EP2017/063586—dated Feb. 19, 2018.

* cited by examiner

| ID | Name | Memory MB | Disk | Ephemeral | Swap | vCPUs | RXTX Factor | isPublic | Capacity |
|---|---|---|---|---|---|---|---|---|---|
| 1 | M1.tiny | 512 | 1 | 0 | | 1 | 1.0 | True | 50 |
| 2 | M1.small | 2048 | 20 | 0 | | 1 | 1.0 | True | 200 |
| 3 | M1.medium | 4096 | 40 | 0 | | 2 | 1.0 | True | 400 |
| 4 | M1.large | 8192 | 80 | 0 | | 4 | 1.0 | True | 800 |
| 5 | M1.xlarge | 16384 | 160 | 0 | | 8 | 1.0 | True | 1000 |

FIG.1

| Memory MB | Disk | Ephemeral | Swap | vCPUs | RXTX Factor | isPublic | Capacity |
|---|---|---|---|---|---|---|---|
| $f_1(x)$ | $f_2(x)$ | $f_3(x)$ | $f_4(x)$ | $f_5(x)$ | $f_6(x)$ | $f_7(x)$ | $f_8(x)$ |
| Mem | $f_2(Mem)$ | $f_3(Mem)$ | $f_4(Mem)$ | $f_5(Mem)$ | $f_6(Mem)$ | $f_7(Mem)$ | $f_8(Mem)$ |
| $f'_1(Disk)$ | Disk | $f'_3(Disk)$ | $f'_4(Disk)$ | $f'_5(Disk)$ | $f'_6(Disk)$ | $f'_7(Disk)$ | $f'_8(Disk)$ |
| $f''_1(vCPU)$ | $f''_2(vCPU)$ | $f''_3(vCPU)$ | $f''_4(vCPU)$ | vCPU | $f''_6(vCPU)$ | $f''_7(vCPU)$ | $f''_8(vCPU)$ |
| x = Mem | Max(1,[x/1024]*10) | 0 | | Max(1,[x/2048]) | 1.0 | True | Min(1000,[x/10,24]) |
| 1024 | 10 | 0 | | 1 | 1.0 | True | 100 |

21 → (row "x = Mem")
22 → (row "1024")

FIG.2

DYNAMIC FLAVOR ALLOCATION

PRIORITY

This nonprovisional application is a U.S. National Stage Filing under 35 U.S.C. § 371 of International Patent Application Serial No. PCT/EP2017/063586 filed Jun. 2, 2017 and entitled "Dynamic Flavor Allocation" which is hereby incorporated by reference in its entirety.

TECHNICAL FIELD

The present application relates to a method for allocating a plurality of virtual machines provided on at least one host to a virtualized network function which provides a defined functional behavior in a network. The application furthermore relates to the corresponding managing entity configured to allocate the virtual machines to the virtualized network function. Further a computer program comprising a program code and a carrier comprising the computer program is provided.

BACKGROUND

A Virtual Network Function (VNF) is an application that runs on a virtualized hardware, differently from Physical Network Function (PNF) that run on dedicated physical hardware (HW).

A VNF is composed by one or more VNF Component (VNFC), each of these components can be present in one or more instances. The number of VNFC instances in a VNF can be fixed or can change according to the different VNFCs and VNFs. The VNFC instance is also called Virtual Machine (VM) hereinafter. Also PNF is composed by Component instances. In general, a VNF can have several VNFC types that are doing different tasks in the application like in a typical multi-tier architecture (typical three tiers are composed for instance by a client front-end, business logic layer and data back-end).

Virtualization Deployment Unit (VDU) is a construct that can be used in an information model, supporting the description of the deployment and operational behavior of a subset of a VNF, or the entire VNF if it was not componentized in subsets (i.e. VNF Components).

The HWs where PNF and VNF Component Instances run are called hosts, on each host there are Compute (CPU), Memory (RAM), Storage (Disk) and Network resources available. A PNF Component instance can use all the resources located on the host where it runs, while a virtual machine Component Instance can use only some of the resources available on a host.

The amount of resources, also called flavor, needed to be allocated to a VM can be fixed or variable. The needed resources are requested before a VM is allocated and, these resources will be dedicated to the VM, and cannot use any other resource. The needed resources for a VM have to be available on a single host.

Each VNF provides one or more services, the Application Capacity to provide the services is equal to the sum of the provided Application Capacity of all VMs belonging to the VNF.

Deployment Flavors

Deployment flavor is a group of templates that describes a specific deployment (of a Network Service or VNF) supporting specific KPIs (Key Performance Indicator) (such as Application Capacity and performance).

A VDU defines a number of parameters, and a person setting up a virtualized network function has a choice of what type of virtual machine to run—just like if the person were purchasing a physical server. In the following, the term Flavor will refer to one of the VDUs that are part of the deployment flavor and will in particular define the quantitative characteristics of the VM resources that are needed to achieve a certain processing capacity like sizes for RAM, disk size, number of cores, network bandwidth and so on. FIG. 1 represents a VNF where the installation package provides five possible VDU or flavor configurations. These are configurable by admin users (the rights may also be delegated to other users) but remains constant after the flavor has been set. As the name implies different configurations will handle different workload sizes (i.e. tiny, small, . . . , xlarge).

TABLE 1

Five flavors

| ID | Name | Memory MB | Disk | Ephemeral | Swap | vCPUs | RXTX Factor | Is Public |
|---|---|---|---|---|---|---|---|---|
| 1 | M1.tiny | 512 | 1 | 0 | | 1 | 1.0 | True |
| 2 | M1.small | 2048 | 20 | 0 | | 1 | 1.0 | True |
| 3 | M1.medium | 4096 | 40 | 0 | | 2 | 1.0 | True |
| 4 | M1.large | 8192 | 80 | 0 | | 4 | 1.0 | True |
| 5 | M1.xlarge | 16384 | 160 | 0 | | 8 | 1.0 | True |

There are many cases where a VM is allocated (first time) or re-allocated (moved from one host to another one) automatically or manually, wherein the flavor is selected during first VNF allocation and can not be changed during the lifetime of the VNF. Major cases are:

Allocation:
  Initial Deployment
  Scale out
Re-allocation
  Evacuation
  Migration All allocations and re-allocations are done on hosts that have available the needed Flavor resources.

Anyway, it can happen that the allocation or re-allocation cannot be done because there is no host able to run a VM with the required flavor. In these cases, it can happen that the VNF can lose availability or serviceability or can be completely shut down.

A virtual machine may be allocated for the first time during the initial deployment or when the scale of the virtual machine is amended or a virtual machine may be reallocated and is thus moved from one host to another host either automatically or manually. The reallocation can occur in case of an evacuation or in case of a migration. The allocation or reallocation is performed with hosts that have available the needed flavor resources. In such a situation it may happen that the allocation or reallocation cannot be carried out as there is no host which is able to run a virtual machine with the required flavor. In such a case it may happen that the virtualized network function cannot be provided and the functional behavior or service provided by the virtual network function has to be terminated.

The number of VMs to allocate and the flavor to use to obtain the requested VNF Application Capacity are decided in the initial planning phase. This is provided as input to a VNF Manager that does not know the real resources availability in the infrastructure, therefore the VNF Manager will forward this as input to a Virtual Infrastructure Manager (VIM) that will take care of the allocation on the hosts according the its own algorithms.

Each VNF component is handled separately with a specific flavor defined for it. In general, when a flavor is chosen and applied to instantiate a virtual machine the number of resources like: vCPU, vRAM, vNetwork and vDisk space are defined in the VDU template that describes the flavor of the VM and this cannot be modified at deployment time. Often disk space is not local to the host so the availability of disk space typically is not critical for the VM allocation.

The same is true for Network resources which require a different handling. So the most important resources to be considered are the vCPU and vRAM, i.e. Compute Resources.

When the VNF manager orders the allocation of VMs to the VIM, if the requested resources are available in the infrastructure (each VM flavor must be available on a single host) the VMs can be allocated. However, if the requested compute resources specified in the flavor/s are not available on the hosts, the VNF allocation fails.

If there isn't a host matching the VM requested flavor, deployment cannot be done. This means that the deployment procedure can fail even if the compute resources that could deliver a VM with reduced characteristics are available inside the infrastructure. The total capacity of the VNF could still be matched overall with a number of VNFC instances running with different sets of compute resources, this for each VNFC type, in the VNF, as long as they can still interwork even if asymmetric in size.

Further disadvantages of current implementation will become apparent to one of skill in the art, through comparison of such complex systems with some aspects of the present invention as reported in present application.

Whenever a new VNF instance must be deployed on the Data Center one of the available VNFD is selected by the user according to some analysis done when the solution is dimensioned.

The VDU descriptors associated with the VNFD will define the resource profile for each of the VNFC to be instantiated. What could happen is that in case the specified resources are not available in the exact number on one of the hosts of the data center the alternative is to wait for new hosts to be added to the DC or to perform complex operations to free resources on existing hosts or rearrange VMs migrating them from one host to another.

Scale out refers to the need to add new VMs to an existing VNF on a data center (DC) to increase the VNF computing capacity. A new VNFC instance will normally use the same flavor as the others. Every time a VNFC with its associated Flavor needs to be scaled out, the VNF Manager will request the resources according to the VDU defined for that VNFC in the VNFD chosen in the initial deployment. As in the initial deployment case also in the scaling out case the resources should be available exactly as requested in VDU. Even if there are resources available but they are on hosts not matching the VDU characteristics, in particular the computing resources requested, the scaling out will fail.

Migration is needed to handle host maintenance, off-line migration involves shutdown of the VM on one host and restarting it on a different host so this can fail if there isn't a host with enough computing resources available, so also in this case allocating a different number of compute resources can be a solution.

For live migration reducing the compute resources in the destination host cannot be used as a solution because size of the VM cannot be changed, in particular memory cannot be removed because live migration copies it from the host where the VM was located to the new one.

In case of host failure VMs must be evacuated, i.e. moved to other hosts, if none of the hosts has spare compute resources that fits the original flavor of each of the VMs to be moved, evacuation cannot be completed.

In case of multiple Host failures, the probability to find hosts with compute resources available according to the VDU descriptor, gets lower and failure to evacuate all VMs is more likely. So this is another use case where the solution applies.

SUMMARY

Accordingly, a need exists to overcome at least some of the above-mentioned drawbacks and to have more flexibility in allocating virtual machines to a virtualized network function.

This need is met by the features of the independent claims. Further aspects are described in the dependent claims.

According to a first aspect a method for allocating a plurality of virtual machines provided on at least one host to a virtualized network function is provided, wherein the network function provides a defined functional behavior in a network and requires a total application capacity for the functional behavior. The functional behavior is provided by needed virtual machines from the plurality of virtual machines, wherein each of the at least one host has an available processing capacity which can be assigned to the virtual machines provided on the corresponding host. Each virtual machine has at least one flavor which indicates a used processing capacity of the available processing capacity of the corresponding host and which corresponds to a partial application capacity of the total application capacity provided by the corresponding virtual machine. According to one step a total application capacity of the virtualized network function is determined and for each of the virtual machines, the at least one flavor is determined taking into account the available processing capacity of the host on which the corresponding virtual machine is provided. Furthermore, the corresponding at least one partial application capacity is determined for each of the virtual machines. Furthermore, the needed virtual machines are determined from the plurality of virtual machines and the needed flavors of the needed virtual machines are determined that are required to provide the total application capacity. Determining the needed virtual machines and needed flavors comprises performing an iterative process in which the needed virtual machines are dynamically determined from the plurality of virtual machines based on the total application capacity. Furthermore, in the iterative process the needed flavor for each of the needed virtual machines is dynamically determined taking into account the total application capacity and the available processing capacity provided on the host on which the corresponding needed virtual machine is provided.

Accordingly, a dynamic flavor allocation is provided that takes into account the total application capacity required by the virtualized network function and taking into account the available processing capacity. Accordingly, the flavors for each virtual machine are not static, but are amended in dependence on the situation in which the virtual machine is needed. The allocation method can be used for the first deployment, for a migration of a virtual machine or for the evacuation of scaling out.

Furthermore, the corresponding managing entity is provided which is configured to allocate the plurality of virtual machines to the virtualized network function wherein the managing entity comprises a memory and at least one processor wherein the memory contains instructions executable by the at least one processor. When the instructions are executed by the at least one processor the steps mentioned above and discussed in more detail below can be carried out.

Furthermore, a computer program comprising a program code to be executed by the at least one processor of the managing entity is provided wherein execution of the program code causes the at least one processor to execute the method discussed above or discussed in more detail below. Furthermore, a carrier comprising the computer program is provided wherein the carrier is one of an electronic signal, optical signal, radio signal, or computer readable storage medium.

It is to be understood that the features mentioned above or features yet to be explained below can be used not only in the respective combinations indicated, but also in other combinations or in isolation without departing from the scope of the present application. Features of the above mentioned and below mentioned aspects and embodiments may be combined with one another in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

FIG. 1 shows a schematic example of a table which indicates different possible flavors of a virtual machine.

FIG. 2 shows a schematic example of a table in which the total application capacity of a virtualized network function wherein a flavor for a virtual machine may be determined using the data shown in the table of FIG. 2.

DETAILED DESCRIPTION OF EMBODIMENTS

Figure 3:
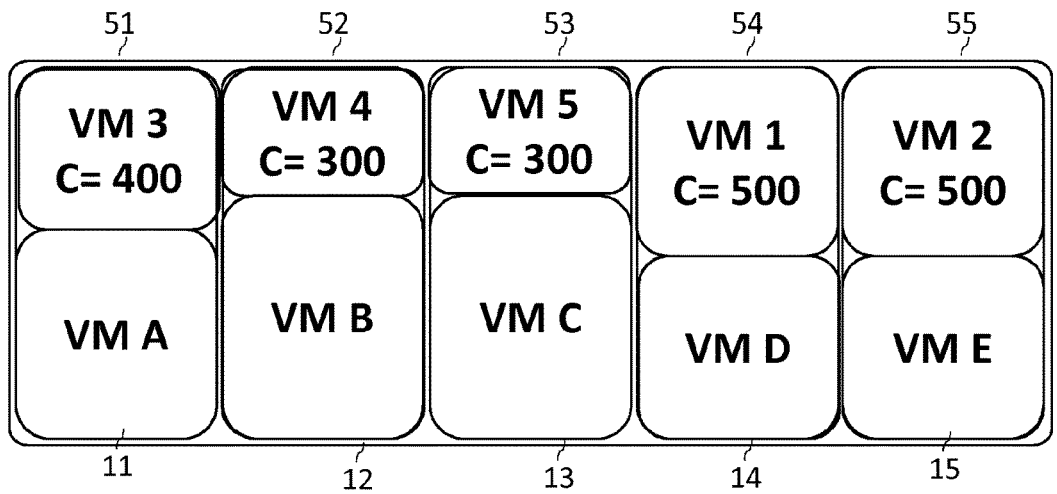
FIG. 3 shows an example system of a data center including several hosts wherein virtual machines are provided on the different hosts with different processing capacity.

In the following, embodiments of the application will be described in detail with reference to the accompanying drawings. It is to be understood that the following description of embodiments is not to be taken in a limiting sense. The scope of the invention is not intended to be limited by the embodiments described hereinafter or by the drawings which are provided for illustration purposes.

The drawings are to be regarded as being schematic representations, and elements illustrated in the drawings are not necessarily shown to scale. Rather, the various elements are represented such that their function and general-purpose becomes apparent to a person skilled in the art. Any connection or coupling between functional blocks, devices, components or physical or functional units shown in the drawings and described hereinafter may also be implemented by an indirect connection or coupling. A coupling between components may be established over a wired or wireless connection. Functional blocks may be implemented in hardware, software, firmware or a combination thereof.

As will be described below in the present application the allocation of virtual machines to a virtualized network function including the different cases such as first deployment, migration, evacuation or scaling out can be made much more flexible as a dynamic flavor allocation is used that is generated taking into account the total application capacity needed for the virtualized network function and taking into account the available processing capacity provided on the different hosts on which the virtual machines are provided. The total application capacity will be preserved within a certain tolerance interval and the virtual machines are allocated with a flavor that fits the availability of the resources of the host on which the corresponding virtual machine is provided. Accordingly, this dynamic flavor allocation increases the number of successful virtual machine allocations.

The mechanism described below which can be used to instantiate virtual machines for a virtualized network function can be applied to the entire life-cycle of the virtualized network function, be it first deployment, scaling, migration, data center maintenance activities or evacuation. Instead of working with a static allocation of virtual machines based on hardcoded flavors a dynamic allocation of virtual machines is provided based on the needed total application capacity wherein different flavors may be used for the virtual machines belonging to the same virtualized network function.

Figure 4:
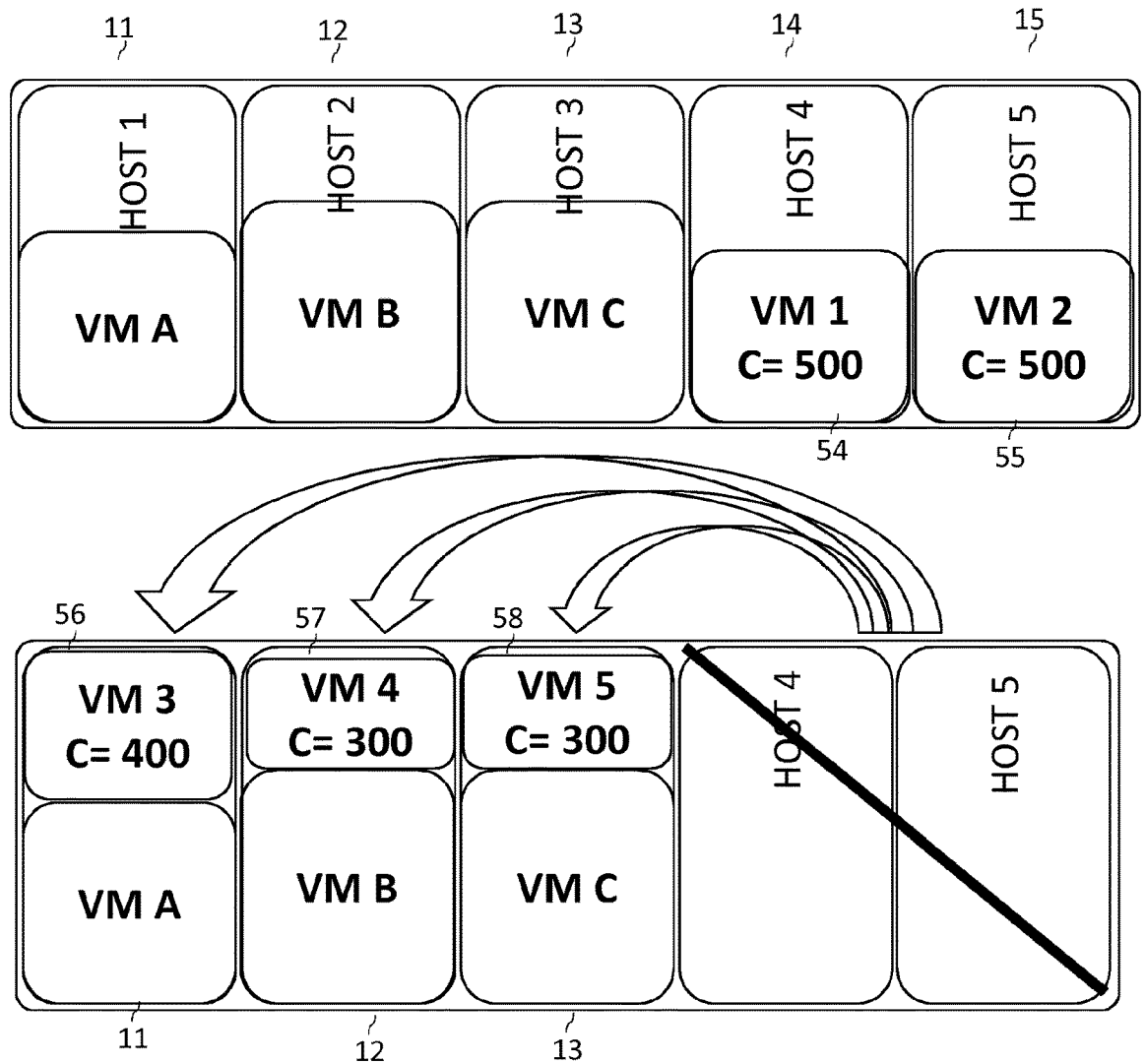
FIG. 4 shows the data center of FIG. 3 wherein the application capacity of virtual machines provided on two of the hosts have to be relocated to other hosts.

FIGS. 3 and 4 show a schematic overview of a system in which a data center comprises different hosts 11 to 15, wherein each host has an available processing capacity which can be assigned to virtual machines. In the example shown in FIG. 3 on the first host two virtual machines are provided, virtual machine A and virtual machine 3. In the embodiment shown in FIG. 3 the complete processing capacity of each host is fully taken by corresponding virtual machines. FIG. 4 shows an embodiment where part of the processing capacity is taken by virtual machines and part of the processing capacity is available. In the example of FIG. 4 the virtual machines provided on hosts 14 and 15 may not be available any more, e.g. in view of maintenance activities, and it is thus necessary to move the processing capacity provided by virtual machines 54 and 55 to the other hosts 11 to 13. In the example shown virtual machines 54 and 55 each have a partial processing capacity of 500 so that the total processing capacity of 1000 has to be distributed to hosts 11 to 13. However, none of the host has enough available processing capacity to provide the capacity of virtual machine 54 or 55 as used on host 14 or 15. As shown in the lower part of FIG. 4 the virtual machines 54 and 55 are then allocated to hosts 11 to 13 by dynamically adapting the flavors of the virtual machines taking into account the available processing capacity and the total application capacity needed by the virtualized network function. In the example shown the total capacity of 1000 not available anymore by virtual machines 54 and 55 is provided by virtual machines 56 to 58 which have a processing capacity such that the total processing capacity is maintained. As can be seen from FIG. 4 the flavor corresponding to the used processing capacity out of the available processing capacity is amended taking into account the available processing capacity and the total application capacity.

Figure 7:
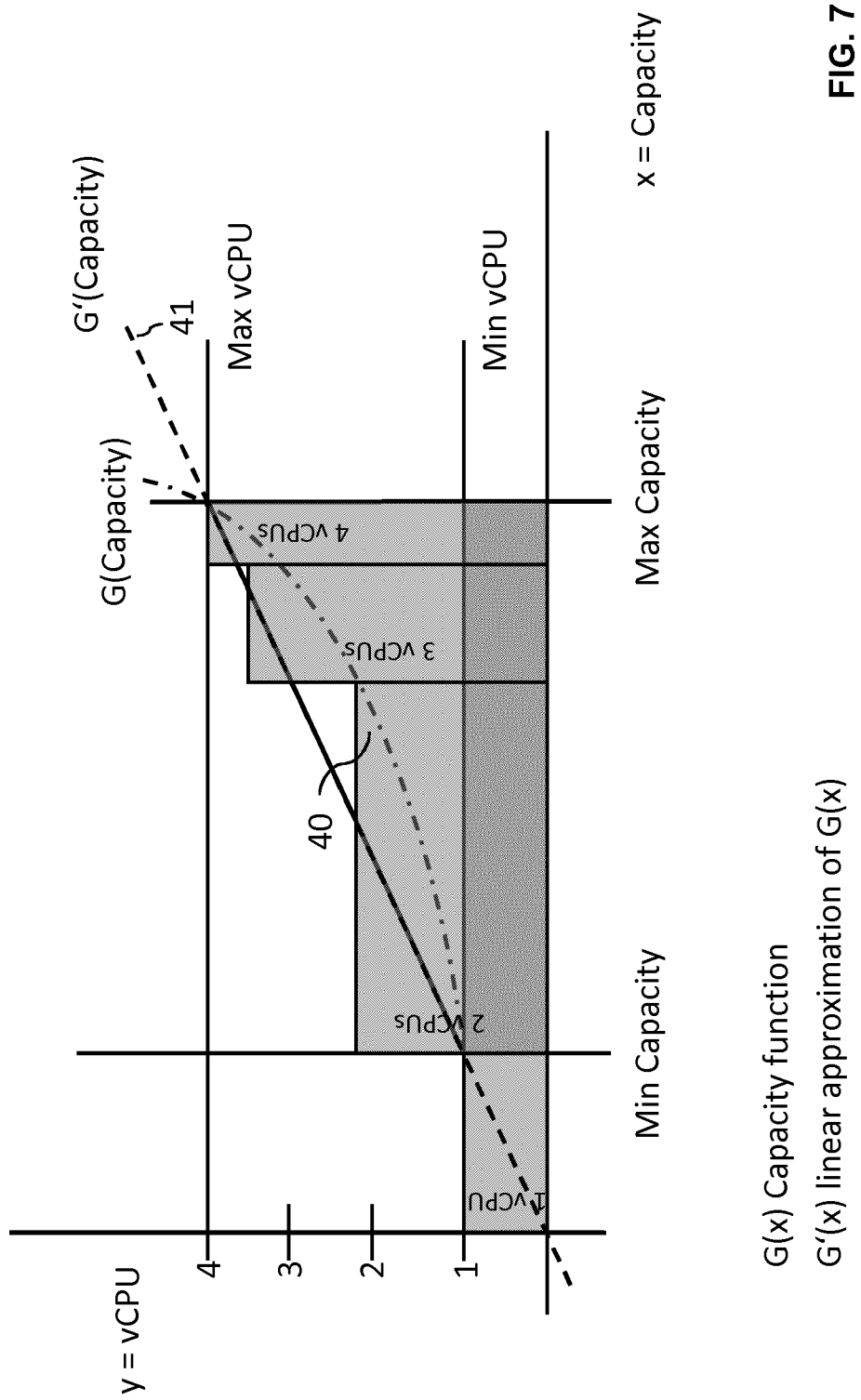
FIG. 7 shows an example function which correlates the application capacity with the number of processing units used in a virtual machine.
Figure 8:
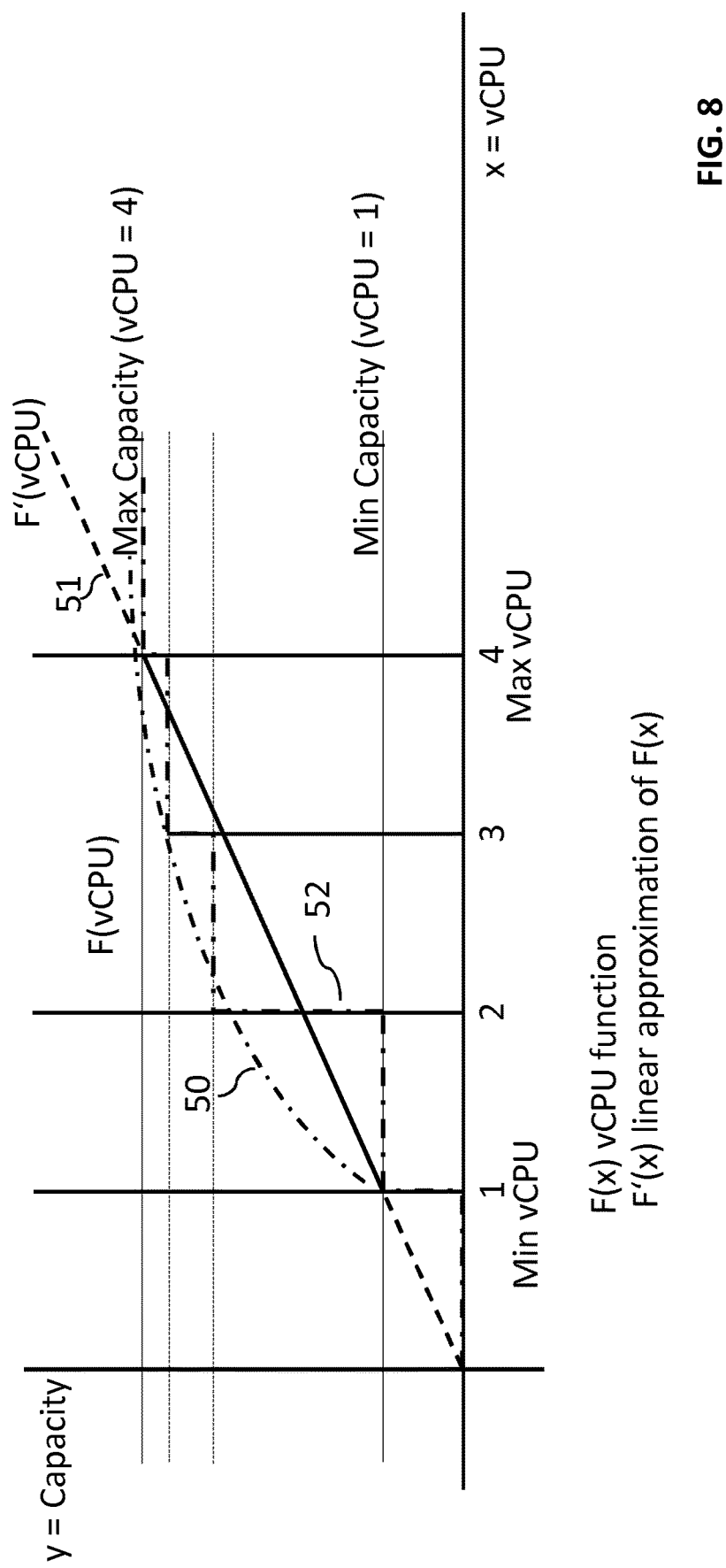
FIG. 8 shows an example function which correlates the number of processing entities with the application capacity in a virtual machine.

In connection with FIGS. 2, 7 and 8 it is explained in more detail how the possible flavors of a virtual machine are determined. In FIG. 2 a table is shown in which the total application capacity of the virtualized network function is expressed with a table of functions. In line 21 the parameter is the available memory and based on the available memory different predefined functions are given to calculate the number of discs or the other processing capacity parameters. Line 22 indicates the determined values for the different processing capacity parameters using the formula mentioned in line 21 and using the value of memory space of 1024 MB. With the values given in line 22 and using the table shown in FIG. 1 it can be deduced that it is possible to use a flavor greater than M1.tiny and smaller than M1.small as the calculated capacity in line 22 is 100 which corresponds to the partial application capacity provided by a virtual machine using the different processing capacity parameters.

FIGS. 7 and 8 show different examples of functions. The function describing the relation between the capacity provided by a VM and the processing resources allocated to that VM (flavors), is mainly dependent from the business logic of the VM itself.

This "capacity function" will be provided for each VNFC as an input to the algorithm and will be used to determine a special relationship between the most important resource for the VNFC and the other available resources.

The capacity function could be available as a formula in some simple cases. However in other cases the function can also be provided in a tabular format, where the values in the table will be calculated by VNF performance verification in a simulated environment. The functions help to determine based on the available processing capacity the application capacity provided by the different virtual machines. The function can approximate and simplify any increasing monotonic function that correlates the application capacity of the virtualized network function with the resources used. Resources may be added up to a certain level and above a certain number the increase in application capacity in order to reach the total application capacity which is delivered can be too low to justify the increase of the used resources so that it might be more efficient to deliver a new virtual machine. FIG. 7 shows an example for different virtual processing cores vCPU and the partial application capacity obtained by the different processing cores. If a single processing unit is used a minimum partial capacity is provided wherein with a maximum number of processing units the maximum application capacity for each virtual machine is provided. The dash-dotted line 40 describes the capacity function whereas the dotted line 41 shows the linear approximation.

FIG. 8 shows another example of function which correlates the number of processing cores with the provided application capacity. The dash-dotted line 50 describes the function as it may have been determined in advance. The dashed line 51 provides the linear approximation and graph 52 shows the step function of how the capacity increases in dependence on the number of processing cores used. As can be seen from FIG. 8, the increase in capacity decreases with the increasing number of processing cores. Accordingly, the increase in application capacity may be too low to justify the increase of processing resources so that it may be more efficient to use a new virtual machine.

Whenever a new virtualized network function should be deployed in a data center an initial requested application capacity shall be given. The initial deployment configuration of the different virtual machines can be calculated according to the requested total application capacity. The method described in more detail below will generate the configuration dynamically defining the flavors of the virtual machines according to the available processing capacity provided on different hosts and based on the total application capacity needed. The method can calculate the set of virtual machines that can deliver the required total application capacity within a certain specified tolerance. Furthermore, it is possible that an optimisation or a reorganisation of the different virtual machines on the different hosts can be carried out at a later stage, by way of example if the total application capacity changes or if the number of hosts changes based on migration or evacuation.

The method described below is able to cope with a change in the total application capacity and a new total application capacity may be used during the use of the virtualized network function so that scaling or migration operations may be needed. In these cases the flavor of the virtual machines that have to be added to handle the increase in the total application capacity can be calculated using the method described below to allocate the additional application capacity. The table such as the table shown in FIGS. 1 and 2 or the functions shown in FIGS. 7 and 8 correlate the computer resources with the application capacity. By way of example if the application capacity of a telephone switch is expressed as the number of processed calls, the requested computer resources like the virtual processing units and memory could be modelled by a linear function of the capacity, by way of example the processed calls per second. One may assume that every virtual processing unit can ensure 50,000 calls processed per second and that the memory needed for this number of calls is 1 GB and that 0.5 GB of memory are allocated constantly as the memory needed to start up the virtual machine regardless of the application capacity. In the example above this gives two functions, the first function f(x) is provided to express the number of virtual CPUs needed f(x)=x/50,000 and the second function f' is used to express the size of the memory needed in GB f'(x)=0.5+(x/50,000).

The method described below provides the best possible allocation of virtual machines belonging to a virtualized network function considering the total application capacity needed and the resources available on the hosts on which the virtual machines are located.

The algorithms provides a best possible allocation of VMs belonging to a VNF considering the VNF characteristic and the resources availability on the hosts of the infrastructure.

The method uses the following parameters:

Max VM Flavor (MaxVMFlavor): is the Max resource allocation for a VM type belonging to the VNF/VNFC for a host. It depends on VNF characteristic and on capacity requested on the VNF to allocate.

Figure 5:
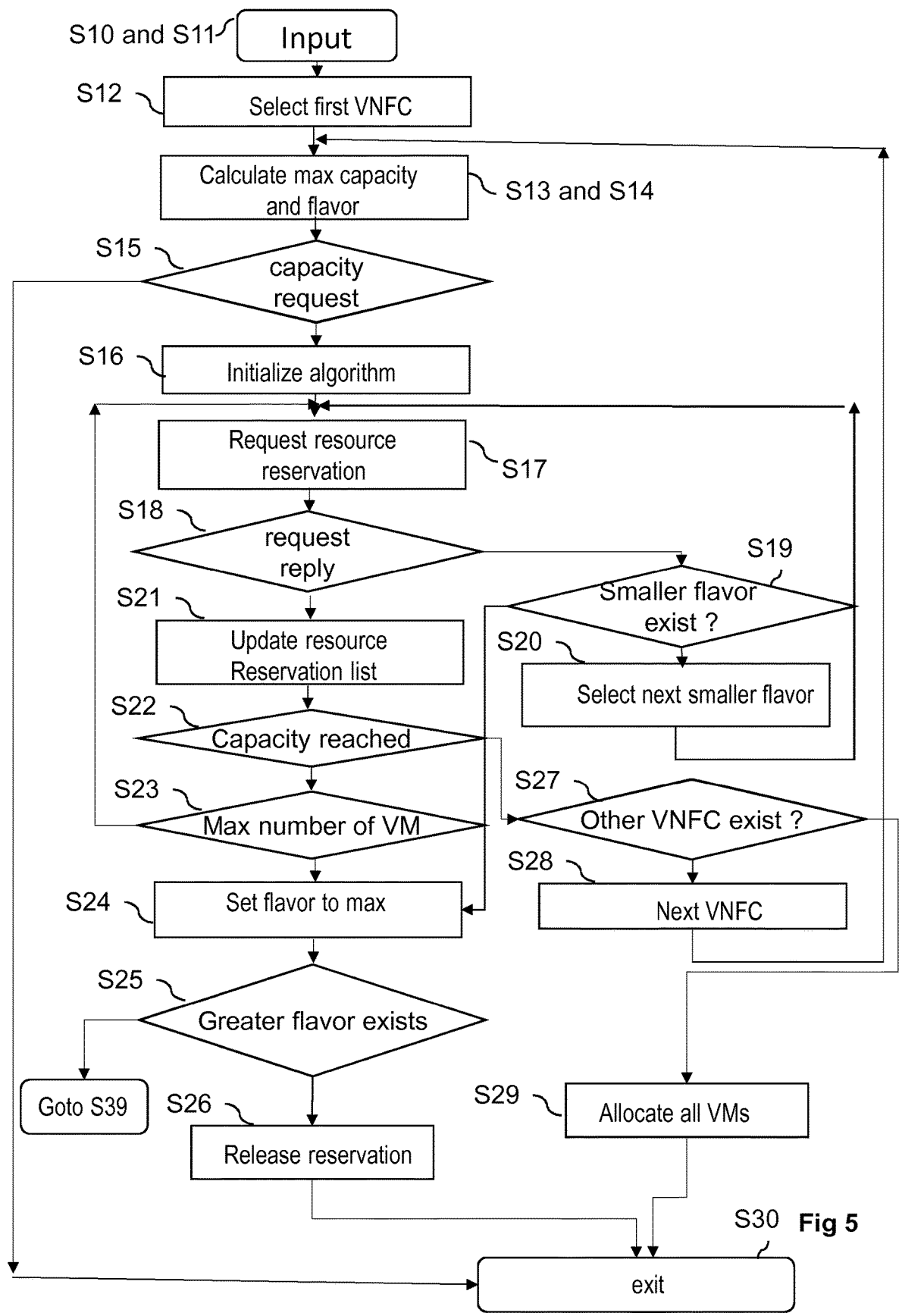
FIG. 5 shows a flowchart of a method carried out in order to allocate virtual machines to a virtualized network function based on the required total application capacity using a dynamic flavor allocation.
Figure 6:
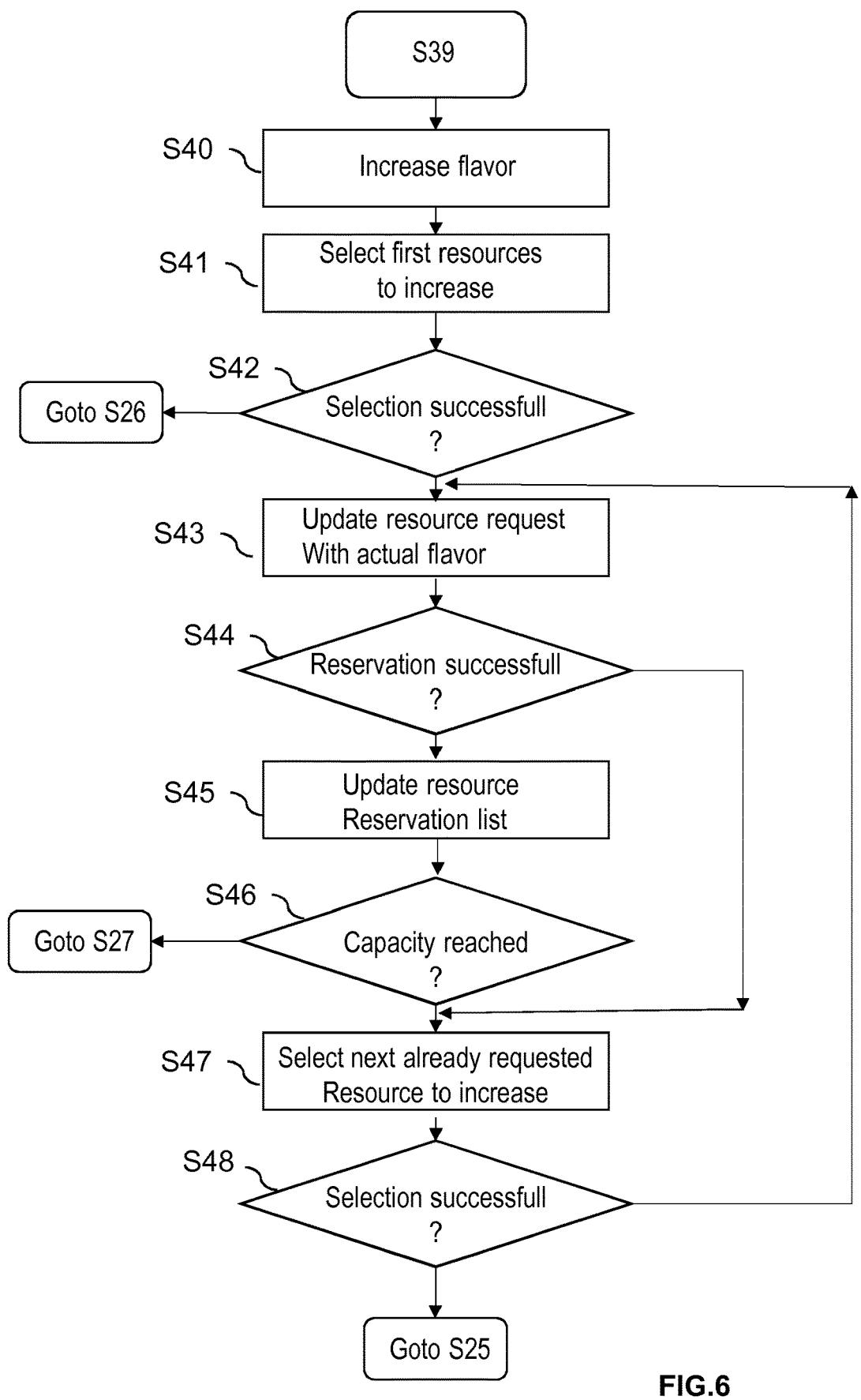
FIG. 6 shows a further part of the method shown in FIG. 5.

Best VM Flavor (BestVMFlavor): is the best resource allocation for a VM type belonging to the VNF/VNFC for a host. It is included in the VNF characteristic, for example, it could be the VM Flavor with best ratio among resources allocated and capacity gained;

Actual VM Flavor (ActualVMFlavor): is the current Flavor used by the algorithm to create or update the resource reservation Previous Actual VM Flavor (PreviousActualVMFlavor): is the last Flavor used, before the Actual VM Flavor in the algorithm, The method will be described in connection with FIGS. 5 and 6.

Input to the Algorithm:

S10: Inputs: The algorithm receives as input the following parameters:

The total application Capacity Requested (CR) for the VNF/VNFC (mandatory parameter)

The Accepted Degraded Capacity (ADC) or threshold application capacity for the VNF/VNFC: it is the minimum capacity to guarantee the VNF level of service. It means that the instantiated VNF/VNFC Capacity should go under this value (optional parameter).

S11: Inputs from VNF Descriptor: Pre-defined values for the VNF

Fault Tolerance value (FT): it is the minimum number of host failures for which the VNF level of service must be guaranteed (for example if Fault Tolerance is 3, the algorithm must ensure that in case of 3 hosts failures the lost VNF/VNFC capacity shall not be less than the Accepted Degraded Capacity). Default value is set to 1 (optional parameter).

Min and Max number of needed VMs: it means that the VNF/VNFC number of instantiated VMs shall be within this range.

Min and Max VM capacity: it means that the capacity of each VM belonging to the VNF/VNFC shall be within this range (application capacity)

Function Flavor=g(VM Capacity) (see FIG. 7)

Function VM Capacity=f(Flavor), note f( ) is the inverse of go (see FIG. 8)

Best VM Flavor/Best VM Capacity

VNF Allocation rules (Affinity, AA (Anti Affinity), acceleration, security, etc.) IF 2 VMs are in AA they can not be allocated on the same host. If tow VMs are in Affinity they should be allocated on the same host. Anti-Affinity rules are stronger than Affinity rules so that AA rules should be always followed, wherein Affinity depends on the capacity of the host.

S12: Select first VNFC

The First (or the only one) VNFC belonging to the VNF is selected, the selection order could be indicated in the VNF Descriptor.

Consider input from S11 only according to the selected VNFC.

S13: Calculate MaxVMCapacity

The Max VM capacity (MaxVMCapacity) allocable on a single VM is the minimum between the following three values:

MaxVMCapacity=MIN[MaxVMCapacity1, MaxVMCapacity2, MaxVMCapacity3]

1) max VM Capacity (corresponding to the maximum allocable application capacity per VM) according to requested Fault Tolerance, Capacity Requested and Accepted Degraded Capacity MaxVMCapacity1=("Capacity Requested"−"Accepted Degraded Capacity")/"Fault Tolerance"

2) max VM Capacity according to Capacity Requested and minimum number of VM

MaxVMCapacity2="Capacity Requested"/"Min number of VMs"

3) max VM Capacity according to the VNF Descriptor

MaxVMCapacity3="Max VM capacity"

S14: Calculate MaxVMFlavor

The Max VM Flavor (MaxVMFlavor) is the higher allocable VM Flavor that provides an Application Capacity for the VM not greater than MaxVMCapacity:

MaxVMFlavor=MAX [Flavors≤g(MaxVMCapacity)]

S15: Check Capacity Requested

The algorithm goes on if with calculated MaxVMFlavor can allocate the VNF Application Capacity.

IF "Capacity Requested">f(MaxVMFlavor)*"Max number of VMs" THEN Error in Requested Capacity. The input parameters are inconsistent and the allocation is terminated with failure (GOTO [S30])

S16: Initialize algorithm

Actual allocable Flavor is set to the First Flavor to use in the Algorithm, it should be equal or close to BestVMFlavor (note it cannot be greater than MaxVMFlavor).

All the "Capacity Requested" is still needed.

ActualVMFlavor=MIN[MaxVMFlavor, BestVMFlavor]

NeededCapacity="Capacity Requested"

List of allocable VMs empty

ReservedVMsForAllocation=0

S17: Request Resource Reservation

VNFM send a request to VIM to reserve resource on a host according to Actual allocable Flavor, considering also all VNF/VNFC Allocation rules (Affinity, AA, acceleration, security, etc.)

CREATE_RESERVATION_RESOURCE_REQUEST (ActualVMFlavor)

S18: Check Request Reply

VIM's answer to the VNFM request can be reservation failure (in negative case) or reservation_ID (in positive case). In the negative case it is not possible to allocate with ActualVMFlavor.

IF CREATE_RESERVATION_RESOURCE_REPLY= RESERVATION_ID (Reservation Success) THEN Allocation can continue with current Flavor (Goto S21)

S19: Check Smaller Flavor exist

Verify if ActualVMFlavor is the smallest, if so the current Flavor cannot be decreased and one should try to increase the Flavor of already reserved resources, IF f(ActualVMFlavor)="Min VM capacity" THEN no smaller Flavor exist, try to increase Flavor of already done reservation (Goto [S24])

S20: Select next smaller Flavor

Set new ActualVMFlavor equal to next smaller Flavor and repeat reservation.

ActualVMFlavor=Next smaller Flavor

Try a new Request Resource Reservation (Goto S17)

S21: Update Resource Reservation list

Insert Reservation_ID and ActualVMFlavor in the list of allocable VMs.

Update the NeededCapacity, reduce it of the capacity gained with ActualVMFlavor

Increase the number of reserved VMs to be allocated

Include Reservation_ID(ActualVMFlavor) in the list of allocable VMs

NeededCapacity=NeededCapacity−f(ActualVMFlavor)

ReservedVMsForAllocation=ReservedVMsForAllocation+1

S22: Check reached Capacity

Verify if NeededCapacity is greater than zero, if not the resource reservation is terminated and the allocation for the VNFC could be performed.

IF NeededCapacity≤0 THEN continue with VMs Allocation (GOTO S27)

S23: Check Max VM number

Verify if "Max number of VMs" has not been reached, if so, other VMs can be added in the list of allocable VMs (request other resources) otherwise it is not possible to do the allocation with current ActualVMFlavor, the algorithm will try to increase already reserved resources.

IF ReservedVMsForAllocation<"Max number of VMs" THEN do another resource request with the same ActualVMFlavor (GOTO S17)

S24: Set Actual Flavor to max used

Set ActualVMFlavor equal to first flavour used at the beginning of the algorithm ActualVMFlavor=MIN[MaxVMFlavor, BestVMFlavor]

S25: Check greater Flavor exists

Verify if ActualVMFlavor is already the maximum allocable flavor, if so the algorithm unsuccessful terminated, all reserved resources must be released. Otherwise the algorithm will continue trying to increase resource allocation already done.

IF ActualVMFlavor<MaxVMFlavor THEN try to increase the already done reservation (GOTO S40)

S26: Failed: Release Reservation

Allocation failed, all reserved resources must be released. For all Reservation_ID in the list of allocable VMs DO RELEASE_RESERVATION_RESOURCE_REQUEST (Reservation_ID) the allocation is terminated with failure (GOTO S30)

S27: Check If other VNFCs exist

Verify if other VNFC must be considered for allocation, if so the next one has to be selected. Otherwise the algorithm can continue with the allocation of all VMs.

IF No more VNFC belonging to the VNF must be considered for resource reservation THEN continue with final allocation (GOTO S29)

S28: Select next VNFC

The next VNFC belonging to the VNF is selected, the selection order could be indicated in the VNF Descriptor. From now on consider inputs from S11 only according to the new selected VNFC.

Continue with new VNFC allocation (GOTO S13)

S29: Success: Allocate all VMs on VNF

All VMs can be allocated in the reserved resources with the selected flavor.

For all Reservation_ID in the list of allocable VMs DO ALLOCATE_RESERVED_RESOURCE_REQUEST (Reservation_ID(Flavor))

S30: EXIT

The algorithm is terminated either successfully with allocation of VMs on the reserved resources or unsuccessfully releasing reserved resources, if any.

S40: Increase Actual Flavor

Store Actual VM Flavor in Previous Actual VM Flavor and increase the Actual VM Flavor.

PreviousActualVMFlavor=ActualVMFlavor

ActualVMFlavor=MIN [Flavors>PreviousActualVMFlavor]

S41: Select first already reserved resources to increase

Select in the list of allocable VMs for the current VNFC the first Reservation_ID with Flavor equal to PreviousActualVMFlavor.

First Reservation_ID where Reservation_ID (Flavor)=PreviousActualVMFlavor

S42: Check Selection Result

If Reservation_ID for VNFC with Flavor equal to PreviousActualVMFlavor has been found the algorithm will try to increase the Flavor for that Reservation_ID otherwise it means that there is any reservation that can be increased and the algorithm can terminate.

IF Selection Result fails THEN the algorithm is unsuccessful terminated, all reserved resources must be released (GOTO S26)

S43: Update resource request with Actual Flavor

VNFM send a request to VIM to update the reserved resource on a host from PreviousActualVMFlavor to ActualVMFlavor UPDATE_RESERVATION_RESOURCE_REQUEST (Reservation_ID, ActualVMFlavor)

S44: Check Request Update Reply

VIM answer to the VNFM request with reservation update failure (in negative case) or reservation_ID (in positive case). In negative case it is not possible to update the Flavor.

IF UPDATE_RESERVATION_RESOURCE_REPLY= Failure (Update reservation Unsuccessful) THEN try to update another reservation (GOTO S47)

S45: Update Resource Reservation list

Update Reservation_ID and ActualVMFlavor in the list of allocable VMs.

Update the NeededCapacity, reduce it of the capacity gained passing from PreviousActualVMFlavor to ActualVMFlavor Update Reservation_ID(ActualVMFlavor) in the list of allocable VMs NeededCapacity=NeededCapacity−f(ActualVMFlavor)+ f(PreviousActualVMFlavor)

S46: Check Reached Capacity

Verify if NeededCapacity is greater than zero, if not the resources reservation is terminated and the allocation for the VNFC could be performed.

IF NeededCapacity≤0 THEN continue with VMs Allocation (GOTO S27)

S47: Select next already requested Resources to increase

Select in the list of allocable VMs for the current VNFC the next Reservation_ID with Flavor equal to PreviousActualVMFlavor.

Next Reservation_ID where Reservation_ID (Flavor)=PreviousActualVMFlavor

S48: Check Selection Result

If another Reservation_ID for VNFC with Flavor equal to PreviousActualVMFlavor has been found the algorithm will try to increase the Flavor for that Reservation_ID otherwise the algorithm will try to increase again already reserved resources.

IF Selection Result success try to update Flavor on selected Reservation_ID (GOTO S43)

ELSE try to increase more the already reserved resources (GOTO S25)

Affinity and anti-affinity rules are generally handled by the VIM and fully re-usable by the proposed algorithm. As a possible improvement to the existing behaviour the following optimization can be taken into account:

In case of a VNF with more VNFC, for instance VNFC-A, VNFC-B, VNFC-C and VNFC-D and two or more of this VNFC are in affinity among them (for example VNFC-A and VNFC-B, it means that it is recommended that in each host, where it is allocated a VM belonging to VNFC-A, also a VM belonging to VNFC-B is allocated), it is possible to reserve resource in the same loop for VMs from both the VNFC in affinity. In this case it is considered as possible Flavor the sum of the single Flavors of the VNFCs. The capacity gain instead will be recorded as 2 separate variables due to the application capacity functions that in general will be different for the two VNFC types.

If it will not be possible to find enough resources on a single host for the VMs from all the VNFC in affinity, the algorithm will continue without considering affinity (trying to allocate single VNFC separately).

In the following the above described method is explained in further detail in the following example.

For sake of simplicity:
- The hosts are servers with the same resources with a certain vRAM and vCPU assume 512 GB and 20 vCPU.
- only one type on VNFC Instance/VM and the corresponding descriptor the VDU is considered, but this could be easily extended to more VDU types.
- resources used in the calculation are only compute resources, i.e. vCPU and vRAM Note: Disk space which is not local to the host is not considered a bottleneck for the allocation same for network capacity.
- the capacity considered is the number of Million calls per hour (MCH) by the VNF, it is equal to the sum of the capacity of all VMs belonging to the VNF.

In this example the Infrastructure is composed of 16 hosts, with the following resource availability (other resources are already taken by other VMs deployed):

| Host# | vCPU | GB vRAM | Possible Flavors | Corresponding capacity |
|---|---|---|---|---|
| 01 | 8 | 6 | 1 | 0.5 MCH |
| 02 | 1 | 12 | 1 | 0.5 MCH |
| 03 | 2 | 4 | 1 | 0.5 MCH |
| 04 | 1 | 4 | 1 | 0.5 MCH |
| 05 | 2 | 16 | 1 or 2 | 0.5 or 2.0 MCH |
| 06 | 0 | 4 | — | — |
| 07 | 6 | 20 | 1, 2, 3 or 4 | 0.5 - 2.0 - 2.5 or 3.0 MCH |
| 08 | 1 | 4 | 1 | 0.5 MCH |
| 09 | 2 | 32 | 1 or 2 | 0.5 or 2.0 MCH |
| 10 | 10 | 12 | 1, 2 or 3 | 0.5 - 2.0 or 2.5 MCH |
| 11 | 8 | 4 | 1 | 0.5 MCH |
| 12 | 0 | 20 | — | — |
| 13 | 2 | 8 | 1 or 2 | 0.5 or 2.0 MCH |
| 14 | 2 | 16 | 1 or 2 | 0.5 or 2.0 MCH |
| 15 | 4 | 16 | 1, 2, 3 or 4 | 0.5 - 2.0 - 2.5 or 3.0 MCH |
| 16 | 1 | 1 | — | — |

Note that:
the Reservation_ID returned by the reservation function will be equal to the Host# reported in the first column this is only added to make the example clearer, but the VNF Manager will use the reservation number in the algorithm.
VIM has the info on Host and resources, the possible Flavor and Capacity according to S11 are added only to explain better the example.

S10:

It is requested to allocate a VNF that can handle 15.0 MCH (wanted Capacity Requested) and the Capacity should never be less of 12.5 MCH (Accepted Degraded Capacity)

S11:

Four flavors are possible (functions f and g, see FIGS. 7 and 8):

Flavor 1 (1 vCPU, 4 GB vRAM)=0.5 MCH

Flavor 2 (2 vCPU, 8 GB vRAM)=2.0 MCH

Flavor 3 (3 vCPU, 12 GB vRAM)=2.5 MCH

Flavor 4 (10 vCPU, 16 GB vRAM)=3.0 MCH

The following values are input by the user to influence the algorithm avoiding VMs that are too big or too much capacity Max VM Capacity 3.0 MCH Min VM Capacity 0.5 MCH Best Flavor is Flavor 2 (higher ratio Capacity/Resource)

Max VM number 8 (VNF needs at most 8 VMs)

Min VM number 3 (VNF needs at least 3 VMs)

Fault Tolerance=1 (it is requested that VNF can survive to 1 host fault)

S12: Select first VNFC

There is only one VNFC belonging to the VNF to be instantiated.

S13: Calculate MaxVMCapacity

The Max allocable Capacity on a single VM is the minimum among:

1) max VM Capacity according to requested Fault Tolerance (FT), Capacity Requested (CR) and Accepted Degraded Capacity (ADC):

(CR−ADC)/FT (15.0−12.5)/1=2.5 MCH (Max capacity that can be lost in case of 1 host Fault)

2) max VM Capacity according to Capacity Requested and minimum number of VM (CR/Min VM Number)

15.0/3=5 MCH 3) max VM Capacity according to the VNF Descriptor (Max VM Capacity in step [0002]):

3 MCH

The max Capacity allocable for a VM is: MaxVMCapacity=2.5 MCH

S14: Calculate MaxVMFlavor

The Max Allocable Flavor on a single VM is:

g(2.5 MCH): MaxVMFlavor=Flavor 3 (3 vCPU, 12 GB vRAM)

S15: Check Capacity Requested

"Capacity Requested"<f(MaxVMFlavor)*"Max number of VMs"

15 MCH<2.5*8=20 MCH

Allocation is possible

S16: Initialize algorithm
Actual allocable Flavor is set to the First allocation Flavor.
All the "Capacity Requested" is still needed.
ActualVMFlavor=MIN[MaxVMFlavor, BestVMFlavor]=MIN[Flavor3, Flavor 2]=Flavor 2
NeededCapacity="Capacity Requested"=15 MCH
List of allocable VMs empty
ReservedVMsForAllocation=0
S17: Request Resource Reservation
Request Resource Reservation with Actual allocable Flavor (first step)
CREATE_RESERVATION_RESOURCE_REQUEST (Flavor 2)
S18: Check Request Reply
Check Request Resource Reply
RESERVATION_ID=5
S21: Update Resource Reservation list
Insert Resource Reservation in the allocable list
Include Reservation_ID(ActualVMFlavor) in the list of allocable VMs->include 5 (Flavor 2)

| Reservation_ID | Flavor |
|---|---|
| 5 | 2 |

NeededCapacity=NeededCapacity-f(ActualVMFlavor)=15-2=13 MCH
ReservedVMsForAllocation=ReservedVMsForAllocation+1=0+1=1
S22: Check reached Capacity
Check If "Capacity Requested" has been reached
NeededCapacity=13>0
S23: Check Max VM number
Check If "Max number of VMs" has been reached, if not other VMs can be added in the list of allocable VMs
ReservedVMsForAllocation=1<"Max number of VMs"=8 (Do another resource request)
S17-S23: (second step)
CREATE_RESERVATION_RESOURCE_REQUEST (Flavor 2)
RESERVATION_ID=7
Include Reservation_ID(ActualVMFlavor) in the list of allocable VMs->include 7 (Flavor 2)

| Reservation_ID | Flavor |
|---|---|
| 5 | 2 |
| 7 | 2 |

NeededCapacity=NeededCapacity-f(ActualVMFlavor)=13-2=11 MCH
ReservedVMsForAllocation=ReservedVMsForAllocation+1=1+1=2
NeededCapacity=11>0
ReservedVMsForAllocation=2<"Max number of VMs"=8 (Do another resource request)
S17-S23: (third step)
CREATE_RESERVATION_RESOURCE_REQUEST (Flavor 2)
RESERVATION_ID=9
Include Reservation_ID(ActualVMFlavor) in the list of allocable VMs->include 9 (Flavor 2)

| Reservation_ID | Flavor |
|---|---|
| 5 | 2 |
| 7 | 2 |
| 9 | 2 |

NeededCapacity=NeededCapacity-f(ActualVMFlavor)=11-2=9 MCH
ReservedVMsForAllocation=ReservedVMsForAllocation+1=2+1=3
NeededCapacity=9>0
ReservedVMsForAllocation=3<"Max number of VMs"=8 (Do another resource request)
S17-S23: (fourth step)
CREATE_RESERVATION_RESOURCE_REQUEST (Flavor 2)
RESERVATION_ID=10
Include Reservation_ID(ActualVMFlavor) in the list of allocable VMs->include 10 (Flavor 2)

| Reservation_ID | Flavor |
|---|---|
| 5 | 2 |
| 7 | 2 |
| 9 | 2 |
| 10 | 2 |

NeededCapacity=NeededCapacity-f(ActualVMFlavor)=9-2=7 MCH
ReservedVMsForAllocation=ReservedVMsForAllocation+1=3+1=4
NeededCapacity=7>0
ReservedVMsForAllocation=4<"Max number of VMs"=8 (Do another resource request)
S17-S23: (fifth step)
CREATE_RESERVATION_RESOURCE_REQUEST (Flavor 2)
RESERVATION_ID=13
Include Reservation_ID(ActualVMFlavor) in the list of allocable VMs->include 13 (Flavor 2)

| Reservation_ID | Flavor |
|---|---|
| 5 | 2 |
| 7 | 2 |
| 9 | 2 |
| 10 | 2 |
| 13 | 2 |

NeededCapacity=NeededCapacity-f(ActualVMFlavor)=7-2=5 MCH
ReservedVMsForAllocation=ReservedVMsForAllocation+1=4+1=5
NeededCapacity=5>0
ReservedVMsForAllocation=5<"Max number of VMs"=8 (Do another resource request)
S17-S23: (sixth step)
CREATE_RESERVATION_RESOURCE_REQUEST (Flavor 2)
RESERVATION_ID=14
Include Reservation_ID(ActualVMFlavor) in the list of allocable VMs->include 14 (Flavor 2)

| Reservation_ID | Flavor |
|---|---|
| 5 | 2 |
| 7 | 2 |
| 9 | 2 |
| 10 | 2 |
| 13 | 2 |
| 14 | 2 |

NeededCapacity=NeededCapacity−
  f(ActualVMFlavor)=5−2=3 MCH
ReservedVMsForAllocation=ReservedVMsForAllocation+
  1=5+1=6
NeededCapacity=3>0
ReservedVMsForAllocation=6<"Max number of VMs"=8 (Do another resource request)
S17-S23: (seventh step)
CREATE_RESERVATION_RESOURCE_REQUEST
  (Flavor 2)
RESERVATION_ID=15
Include Reservation_ID(ActualVMFlavor) in the list of allocable VMs->include 15 (Flavor 2)

| Reservation_ID | Flavor |
|---|---|
| 5 | 2 |
| 7 | 2 |
| 9 | 2 |
| 10 | 2 |
| 13 | 2 |
| 14 | 2 |
| 15 | 2 |

NeededCapacity=NeededCapacity−
  f(ActualVMFlavor)=3−2=1 MCH
ReservedVMsForAllocation=ReservedVMsFor
  Allocation+1=6+1=7
NeededCapacity=1>0
ReservedVMsForAllocation=7<"Max number of VMs"=8 (Do another resource request)
S17: Request Resource Reservation
Request Resource Reservation with Actual allocable Flavor (eighth step)
CREATE_RESERVATION_RESOURCE_REQUEST
  (Flavor 2)
S18: Check Request Reply
RESERVATION_ID=Reservation Failure
S19: Check Smaller Flavor exist
f(Flavor 2)=2.0>0.5 MCH (smaller Flavor exist)
S20: Select next smaller Flavor
Set new ActualVMFlavor equal to next smaller Flavor and repeat reservation.
  ActualVMFlavor=MAX [Flavors<ActualVMFlavor]=MAX [Flavors<Flavor 2]=Flavor 1
S17-S23: (ninth step)
CREATE_RESERVATION_RESOURCE_REQUEST
  (Flavor 1)
RESERVATION_ID=1
Include Reservation_ID(ActualVMFlavor) in the list of allocable VMs->include 1 (Flavor 1)

| Reservation_ID | Flavor |
|---|---|
| 5 | 2 |
| 7 | 2 |
| 9 | 2 |

-continued

| Reservation_ID | Flavor |
|---|---|
| 10 | 2 |
| 13 | 2 |
| 14 | 2 |
| 15 | 2 |
| 1 | 1 |

NeededCapacity=NeededCapacity−f(Actual
  VMFlavor)=1 0.5=0.5 MCH
ReservedVMsForAllocation=ReservedVMsFor
  Allocation+1=7+1=8
NeededCapacity=0.5>0
ReservedVMsForAllocation=8="Max number of VMs"=8 (Max number of VM reached)
S24: Set Actual Flavor to max used
ActualVMFlavor=MIN[MaxVMFlavor, BestVMFlavor]=MIN[Flavor3, Flavor 2]=Flavor 2
S25: Check greater Flavor exists
Check If ActualVMFlavor can be increased
IF ActualVMFlavor<MaxVMFlavor
Flavor 2<Flavor 3 (Reserved Resource could be increased)
S40: Increase Actual Flavor
PreviousActualVMFlavor=ActualVMFlavor=Flavor 2
ActualVMFlavor=MIN
  [Flavor>PreviousActualVMFlavor]=Flavor 3
S41: Select first already reserved resources to increase
First Reservation_ID where Reserved Flavor is Flavor 2=5
S42: Check Selection Result
Exist a reservation_ID with Flavor 2 (Selection Success)
S43: Update resource request with Actual Flavor
UPDATE_RESERVATION_RESOURCE_REQUEST(5, Flavor3)
S44: Check Request Update Reply
UPDATE_RESERVATION_RESOURCE_REPLY=
  Failure (Host 5 cannot allocate Flavor 3)
S47: Select next already requested Resources to increase
Next Reservation_ID where Reserved Flavor is Flavor 2=7
S48: Check Selection Result
Exist another reservation_ID with Flavor 2 (Selection Success)
S43: Update resource request with Actual Flavor
UPDATE_RESERVATION_RESOURCE_REQUEST(7, Flavor3)
S44: Check Request Update Reply
UPDATE_RESERVATION_RESOURCE_REPLY=
  Success (Host 7 can allocate Flavor 3)
S45: Update Resource Reservation list
Update Reservation_ID(ActualVMFlavor) in the list of allocable VMs->update 7 (Flavor 3)

| Reservation_ID | Flavor |
|---|---|
| 5 | 2 |
| 7 | 3 |
| 9 | 2 |
| 10 | 2 |
| 13 | 2 |
| 14 | 2 |
| 15 | 2 |
| 1 | 1 |

NeededCapacity=NeededCapacity−f(ActualVMFlavor)+
f(PreviousActualVMFlavor)=0.5−2.5+2=0 MCH S46: Check Reached Capacity Check If "Capacity Requested" has been reached NeededCapacity=0 (Reservation successful for current VNFC)

S27: Check If other VNFCs exist

Check If other VNFC must be allocated

No more VNFC belonging to the VNF must be considered for resource reservation (continue with final allocation)

S29: Success: Allocate all VMs on VNF

Allocate all VMs with selected Flavor in the reserved resources

For all Reservation_ID in the list of allocable VMs DO

| Reservation_ID | Flavor |
|---|---|
| 5 | 2 |
| 7 | 3 |
| 9 | 2 |
| 10 | 2 |
| 13 | 2 |
| 14 | 2 |
| 15 | 2 |
| 1 | 1 |

ALLOCATE_RESERVED_RESOURCE_REQUEST (Reservation_ID(Flavor))

S30: EXIT

Algorithm Terminated

In the following, the dynamic flavor mechanism described above is compared with the situation where flavors are predefined and selected.

HW resources could be unavailable for any number of reason, one is that the DC is delivered without too much spare capacity to save CAPEX, but there can be other causes like planned/unplanned host maintenance, Scale Out, new VNF deployment or any disaster situation that could reduce the resources available also for medium or big DC.

If all the above cases have to be taken in account at the same time, the DC must be configured with a number of spare compute resources.

Initial Deployment

In this Use Case a new VNF must be deployed, but the compute resources specified in the selected VNFD cannot be found on any of the hosts in the DC.

Existing Solution:

VNF will deliver the expected Application Capacity only when hosts with all needed resources will be available in the DC.

So, until the DC is updated with new hardware the expected Application Capacity will not be available with loss of serviceability for Tenant and final user.

New Method:

Deployment done immediately, with new Flavors generated by the algorithm to guarantee requested Application Capacity.

Scale Out

The Use Case refers to the need to add new VMs to an existing VNF on a DC and the hosts don't have enough resources available to allocate new VMs using the same flavor as the other VMs already allocated for that VNFC type. The situation is similar to a first deployment that cannot be completed due to missing resources.

Existing Solution:

Scale out will be done only when new resources will be available in the DC.

Until the DC is updated there could be a loss of serviceability for Tenant and final user.

New Method:

The algorithm will adapt the flavors to the available resources delivering an increased Application Capacity for the VNF. No need to update the DC with new HW to deliver the requested increased Application Capacity.

Offline Migration

The following Use Case refers to the need to migrate existing VMs from one host to another on a DC where there isn't a host with enough free resources that can accommodate the VM with the Flavor that was selected for it.

Existing Solution:

Migration will be possible only when new resources are available in the DC. Until more HW is installed in the DC, serviceability for Tenant and final user is reduced. It could result in a complete loss of service.

Note: In current technologies, for Live Migration this invention cannot be applied because size of the VM cannot be changed at runtime today, in particular memory cannot be removed because live migration copies it from the host where the VM was located to the new one.

New Method:

Migration done immediately. The proposed algorithm uses more spare resources with a flexible definition of the flavors in order to free the host keeping the serviceability and Application Capacity to the same level.

Evacuation

In this Use Case there is the need to evacuate a VM, but there aren't enough free resources on single host to allocate a VM with same flavor deployed as the one deployed on the original host.

Existing Solution:

No VM with different flavor can be allocated. This cannot be avoided. Until the DC is updated with new HW serviceability for Tenant and final user is reduced. In the worst case there could result in a complete loss of service.

New Method:

With the proposed algorithm, Evacuation can be done, delivered Application Capacity of the VNF does not change.

Figure 9:
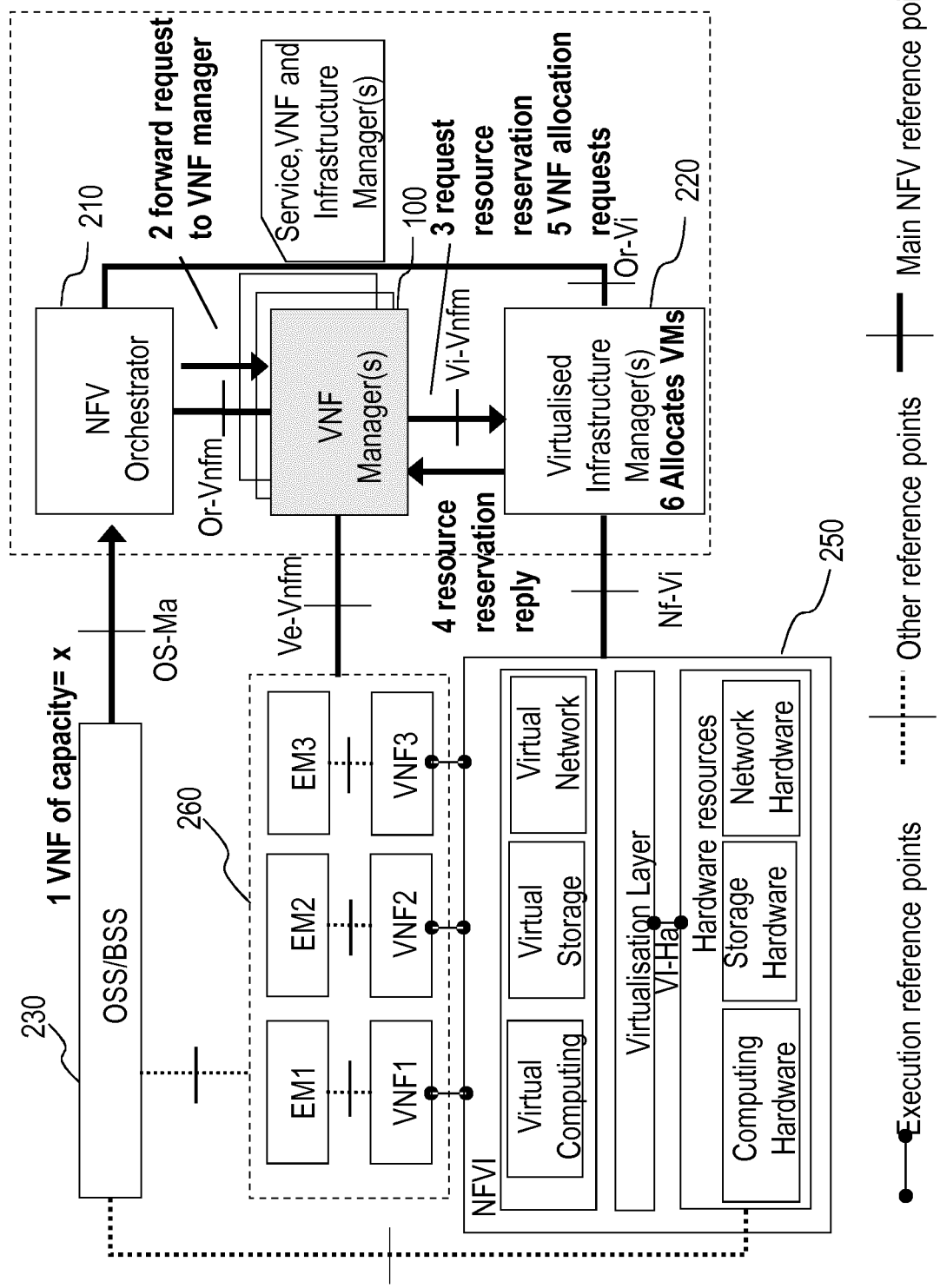
FIG. 9 shows an example architectural view in which a managing entity configured to allocate the virtual machines to the virtualized network function is provided.

FIG. 9 shows an architectural overview over a system in which a managing entity 100 determines the flavors of the virtual machines and allocates the virtual machines to the virtualized network function as discussed above. The managing entity 100 which is indicated as virtualized network function manager receives the request for setting up a virtualized network function from the network function virtualization orchestrator 210 which is an entity that generates, maintains the network services of the virtualized network functions. This orchestrator 210 is furthermore responsible for the global resource management of the processing resources. The orchestrator 210 receives the request for setting up the virtualized network function from an operation support system/business support system 230. The managing entity 100 then coordinates which flavors and virtual machines are used with the virtualized infrastructure manager (VIM) 220 which is responsible for controlling and managing the computer, network and storage resources. Element 250 describes the network function virtualization infrastructure and entity 260 indicates the element management system which is responsible for the functional management of the virtualized network function and the virtualized network function itself.

Figure 10:
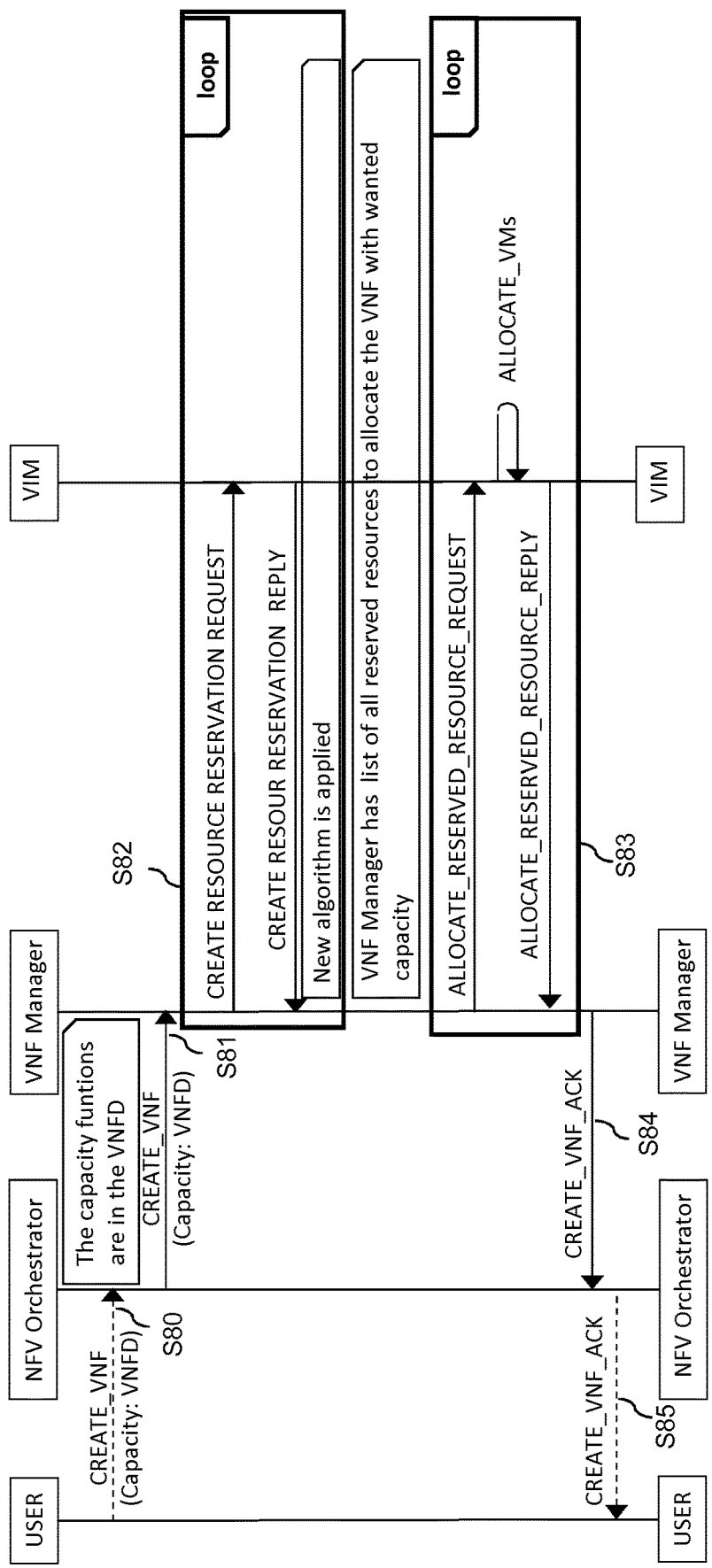
FIG. 10 shows an example message exchange when a virtualized network function is deployed for the first time using a method as indicated in FIG. 5 or 6.

FIG. 10 summarizes the message exchange between the entities shown in FIG. 9. In step S80 the user of the OSS/BSS transmits a request for setting up a virtualized network function to the orchestrator 210. The orchestrator 210 transmits a message to the managing entity 100 indicating that the virtualized network function should be created (step S81). The managing entity 100 and the virtualized infrastructure manager 220 then exchange messages in an iterative process in step S82 until the wanted capacity is reached in which the managing entity transmits a request message for resource reservation to manager 220 including the amount of resources, the attributes and the flavors. The manager 220 responds with a resource reservation reply message. After this iterative process summarized by step S82 the managing entity has a list of all reserved resources used to allocate the virtualized network function with the required total application capacity. In a further processing loop the managing entity 100 transmits a request message to the manager 220 to allocate the resources which is done by the manager 220 which then informs the managing entity 100 about the allocated resources (step S83).

In steps S84 and S85 the user is informed about the created virtualized network function by an acknowledgement message.

Figure 13:
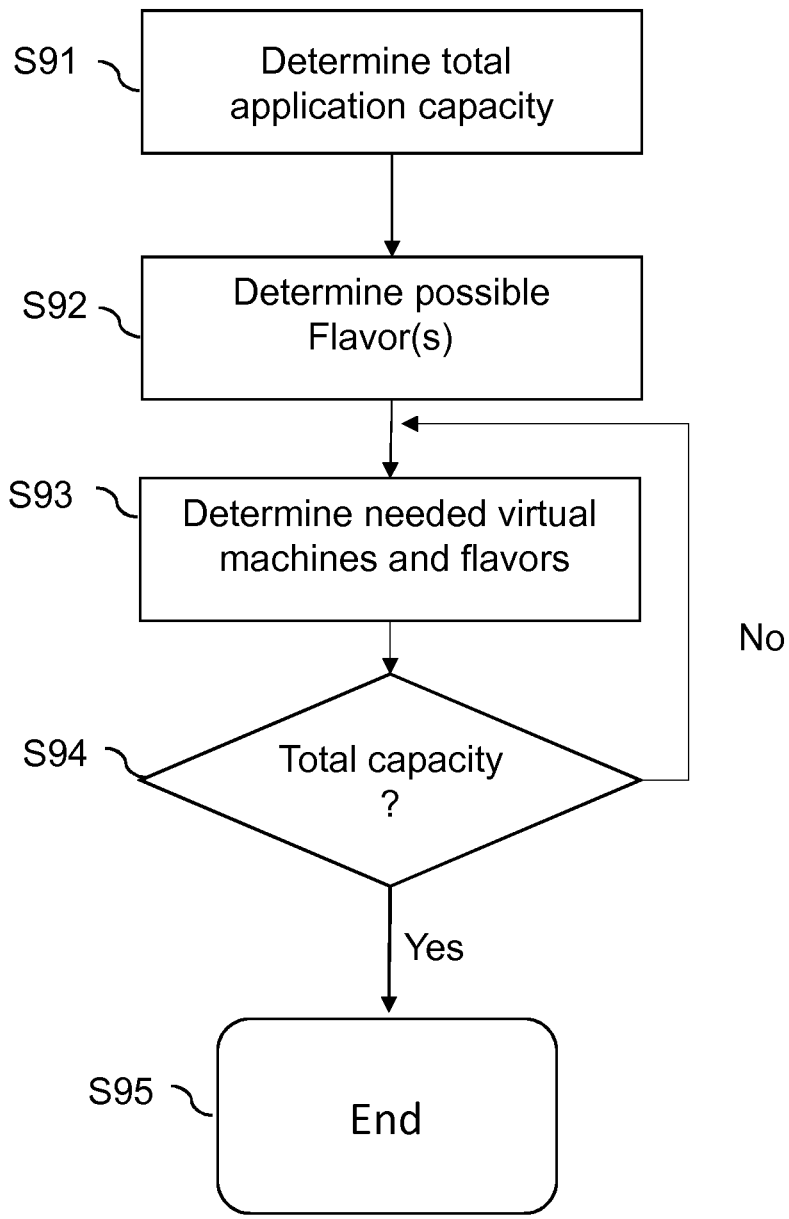
FIG. 13 shows a schematic flowchart summarising some of the steps carried out for a flexible flavor allocation in a managing entity as shown in FIG. 11 or 12.

FIG. 13 summarizes some of the steps carried out by managing entity 100. In step S91 the managing entity 100 determines the total application capacity as it is needed for the virtualized network function. By way of example the total capacity may be determined from the message received from the orchestrator 210 discussed above in connection with FIG. 9. The managing entity then determines the possible flavors for each of the virtual machines based on the available processing capacity of the host and based on the partial application capacity provided by each of the virtual machines. In step S93 the needed virtual machines and the needed flavors are determined which are needed in order to provide the virtualized network function with the total application capacity. This iterative process is repeated until it is determined in step S94 that the total capacity is obtained by the virtual machines as calculated.

Figure 11:
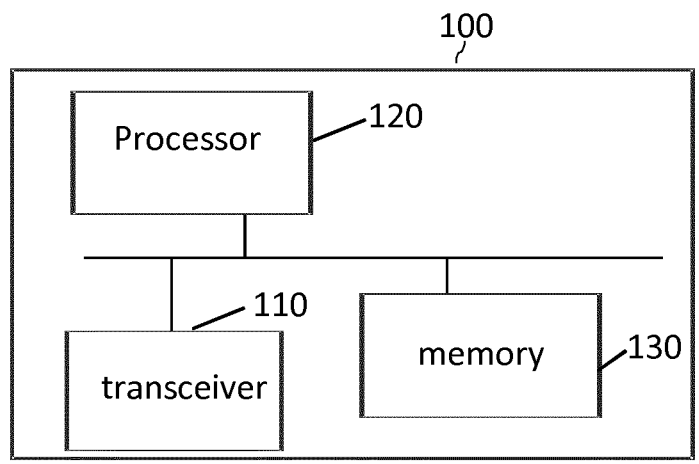
FIG. 11 shows an example schematic representation of the managing entity configured to allocate the virtual machines to the virtualized network function using the dynamic flavor allocation as described in FIGS. 5 and 6.

FIG. 11 shows a schematic view of a managing entity 100 as shown in FIG. 9 which controls the allocation of the virtual machines to the virtualized network function as described above. The managing entity 100 comprises an interface 110 which is provided for transmitting user data or control messages to other entities such as the entities discussed above in connection with FIGS. 9 and 10. The interface is furthermore provided for receiving user data or control messages from the other entities. The managing entity and its interface is especially configured to receive the input data about the needed total application capacity and the reply messages from the virtual infrastructure manager 220. The managing entity furthermore comprises a processor 120 which is responsible for the operation of the managing entity 100. The processor 120 comprises one or more processing units and can carry out the instructions stored on a memory 130 wherein the memory may include a read-only memory, a random access memory, a mass storage, a hard disk or the like. The memory can furthermore include a suitable program code to be executed by the processing unit 120 so as to implement the above described functionalities in which the managing entity is involved. Entity 100 may be provided as a single entity provided at a certain location, however, it is also possible that the managing entity itself is provided in the cloud and distributed over several virtual machines.

Figure 12:
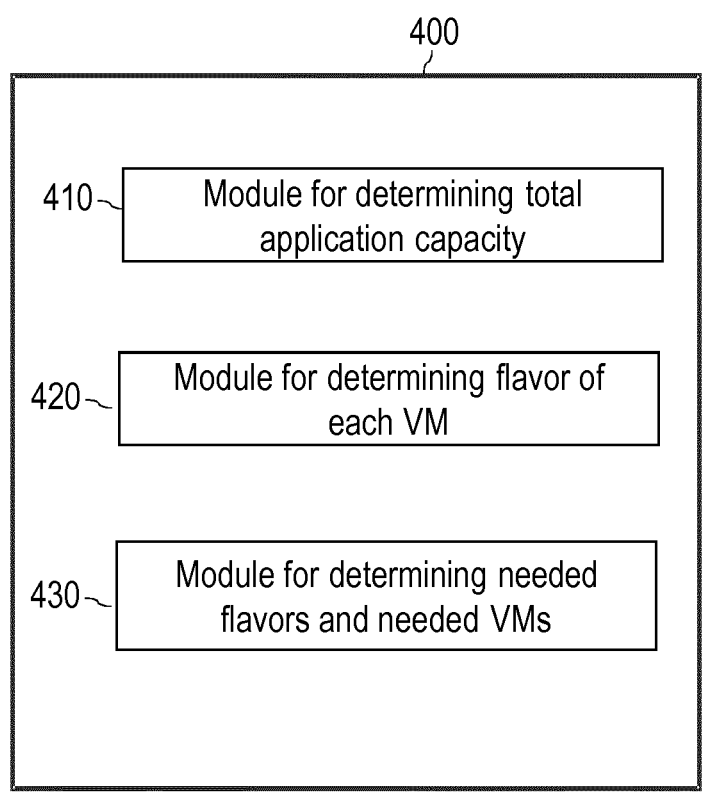
FIG. 12 shows another example schematic representation of a managing entity configured to provide the dynamic flavor allocation for the virtual machines used to provide a virtualized network function.

FIG. 12 shows another example of a managing entity similar to the one shown in FIG. 11 and which can allocate virtual machines to a virtualized network function using a flexible flavor determination based on the total application capacity and based on the available processing capacity on the different hosts. The managing entity 400 comprises a module 410 for determining the total application capacity needed for the virtualized network function. Furthermore, a module 420 is provided which determines, for each of the virtual machines, the at least one flavor. Furthermore, a module 430 is provided which determines the needed virtual machines and the needed flavors that are required to provide the total application capacity using the above described mechanism.

From the above discussion some general conclusions can be drawn.

The used processing capacity of each virtual machine depends on the plurality of processing capacity parameters as shown in FIG. 1 which depend on the available processing capacity provided by the available processing resources of the host on which the corresponding virtual machine is provided. One flavor for one virtual machine then corresponds to a set of values of the processing capacity parameters and if different flavors for one virtual machine are provided, the different flavors correspond to different sets of values of the processing capacity parameters. The at least one flavor for one virtual machine is then determined based on a predefined function which correlates the values of the processing capacity parameters with the partial application capacity provided by said one virtual machine. The function can be a function as shown in FIG. 2 or as shown in FIG. 7 or 8.

In the above described method a threshold application capacity is determined for the virtual network function below which the application capacity provided by the needed virtual machines should not drop. The needed virtual machines and the needed flavors are then determined in the iterative process taking into account the determined threshold application capacity. An example given above the threshold application capacity was 12.5 million calls per hour.

Furthermore, it is possible that a fault tolerance value is determined indicating a number of failed hosts. When the number of hosts indicated by the fault tolerance value fail, the needed number of virtual machines minus the failed hosts should still be able to provide the determined threshold application capacity. The needed virtual machines and the needed flavors are determined in the iterative process taking into account the determined fault tolerance value. In the example above the fault tolerance value was set to 1.

In the above described method a step may be carried out in which a minimum and a maximum number of needed virtual machines is calculated wherein the number of needed virtual machines is higher than or equal to the minimum number of virtual machines and lower than or equal to the maximum number of virtual machines. The needed virtual machines and the needed flavors are then determined in the iterative process taking into account the determined minimum and maximum number. In the example given above the minimum number was 3 and the maximum number of virtual machines was 8 and these numbers were used in some of the process steps such as step S15.

Furthermore, the method may comprise the step of determining a minimum and maximum application capacity for each virtual machine, wherein the partial application capacity provided by each virtual machine is higher than or equal to the minimum application capacity and lower than or equal to the maximum application capacity wherein the needed virtual machines and the needed flavors are determined in the iterative process taking into account the determined minimum and maximum application capacity for each virtual machine. In the example given above the minimum and maximum application capacity for the virtual machines were set to 0.5 million calls per hour and 3 million calls per hour.

Furthermore, the method may comprise the step of determining a best flavor for each of the virtual machines which comprise more than one flavor. The best flavor is the flavor providing the lowest ratio between the used processing capacity relative to the partial application capacity provided by the corresponding virtual machine. The needed virtual machines and the needed flavors are then determined in the iterative process taking into account the best determined flavor. In the example given above the best determined flavor was flavor 2.

In another embodiment the best flavor is determined for each virtual machine taking into account predefined requirements needed for providing the defined functional behavior of the virtualized network function. In this embodiment the best flavor is independent from the resources available on the host but is determined taking into account the needs of the virtual network function related for example to latency as bigger virtual machines may have a lower latency, or the speed of time to migrate as small virtual machines may migrate faster. So the virtualized network function could prefer to have bigger and smaller virtual machines independent of the host resources.

Furthermore, it is possible that when a number of needed virtual machines corresponds to the maximum number of virtual machines and the total application capacity is not reached, the flavor of at least one of the needed virtual machines having more than one flavor is increased in the iterative process until the total application capacity is reached. In the example given above the maximum number of virtual machines was reached, however, the total capacity was not reached so that for one virtual machine the flavor was increased from the best flavor to a higher flavor 3.

It is possible to start the iterative process with selecting the virtual machines having a flavor close to the determined best flavor. It is then checked whether the total application capacity can be obtained with selecting the virtual machines from the plurality of virtual machines having a processing capacity close to the best flavor as needed virtual machines. When it is not possible to obtain the total application capacity only with virtual machines with a flavor close to the best flavor, either the flavors of the needed virtual machines are amended or another virtual machine from the plurality of virtual machines having a flavor different from the best flavors added to the needed virtual machines until the total application capacity is reached.

Furthermore, it is possible in the process to determine a maximum allocable partial application capacity defining a maximum partial application capacity allocated to one virtual machine. The needed virtual machines and the needed flavors are then determined in the iterative process taking into account the determined maximum allocable partial application capacity. In the example given above the maximum allocable partial application capacity was 2.5 million calls per hour. As discussed above in step S13 it is possible to determine a first value of the maximum allocable partial application capacity based on the total application capacity, the threshold application capacity and the fault tolerance value. Furthermore, a second value of the maximum allocable partial application capacity is determined based on the total application capacity, and the minimum number of virtual machines. Furthermore, a third value of the maximum allocable partial application capacity may be determined based on the total application capacity and based on the maximum application capacity available for the plurality of virtual machines on the VNFD. See also step S11: inputs from the VNF descriptor. The maximum application capacity is a predefined value in the VNFD and is independent of the requested total capacity. It can be the maximum value in the table or in the FIGS. 7 and 8. The maximum allocable partial application capacity then corresponds to the minimum of the three determined values.

In the examples given above the first value was 2.5 million calls per hour, the second value was 5 million calls per hour and the third value was 3 million calls per hour so that the maximum allocable part of the application capacity was 2.5 million calls per hour as this was the minimum value.

Furthermore, it is possible, before the iterative process is started, to check whether it is possible to provide the total application capacity using the maximum number of needed virtual machines with the maximum allocable partial application capacity. Only if this is the case the iterative process may be started. This was done in step S15 where it was checked that the allocation is possible in theory.

Summarising the present invention describes a method which allows the adaption of the resource allocation of virtual machines to a required total application capacity using a dynamic flavor allocation. The dynamic flavor allocation increases the number of successful virtual machine allocations and limits the situations where the allocation fails due to limited resources in the data center.

The above described method has the following advantages:

The invention intends to describe an algorithm that will make possible to adapt VM resource allocation to the desired or measured Application Capacity realizing a dynamic flavor VNF allocation.

This dynamic flavor allocation algorithm will also increase the number of successful VM allocation limiting the situations where the system is not protected due to limited resources in the DC.

The following advantages can be identified:
1. VNF/VNFC are allocated according to Application Capacity to deliver. The solution allocates in adaptive way the VMs considering the actual resources available on the hosts.
2. This solution will increase the number of successful VNF allocations in small and private Data Centers. In those DCs the VM allocation can easily fail due to lack of available hosts with the requested resources. This is more frequent in telecom domain where, differently to IT domain, the VNF are allocated in small and private data center at the edge of the network to optimize service characteristics.
3. This solution will increase the number of successful VNF re-allocations when, due to a temporary problem (e.g. power failure, partial hardware unavailability, maintenance operations), there is a shortage of hardware resources in the Data Center. This invention will allow re-allocations preserving the requested Application Capacity.
4. This solution will increase the number of successful VNF re-allocations to another DC in case of disaster. The receiving DC could have problems to accommodate the requested resources according to the requested Application Capacity.

5. Lifecycle management use cases like Offline Migration, evacuation, initial deployment and scale out can take advantage by the proposed solution.
6. The optimization will allow delivering of the capacity with lower CAPEX.
7. Automatic successful allocations and re-allocations of a VNF/VNFC will allow OPEX savings.
8. Increase the maximum Capability and Serviceability.
9. Guaranteed in service performance of the telecom system where redundancy schemes are implemented.

The invention claimed is:

1. A method for allocating a plurality of virtual machines provided on at least one host to a virtualized network function which provides a defined functional behavior in a network and requires a total application capacity for the functional behavior, the functional behavior being provided by needed virtual machines from the plurality of virtual machines, wherein each of the at least one host has an available processing capacity which can be assigned to the virtual machines provided on the corresponding host, and each of the plurality of virtual machines has at least one flavor which indicates a used processing capacity of the available processing capacity of the corresponding host and which corresponds to a partial application capacity of the total application capacity provided by the corresponding virtual machine, the method comprising:
   determining the total application capacity of the virtualized network function,
   determining, for each of the virtual machines, the at least one flavor taking into account the available processing capacity of the host on which the corresponding virtual machine is provided, and the corresponding at least one partial application capacity,
   determining the needed virtual machines from the plurality of virtual machines and needed flavors of the needed virtual machines that are required to provide the total application capacity, wherein determining the needed virtual machines and needed flavors comprises:
   performing an iterative process in which the needed virtual machines are dynamically determined from the plurality of virtual machines based on the total application capacity, and in which the needed flavor for each of the needed virtual machines is dynamically determined taking into account the total application capacity and the available processing capacity provided on the host on which the corresponding needed virtual machine is provided.

2. The method according to claim 1, wherein the used processing capacity of each of the plurality of virtual machines depends on a plurality of processing capacity parameters which depend on the available processing capacity provided by available processing resources of the host on which the corresponding virtual machine is provided, wherein one flavor for one virtual machine corresponds to a set of values of the processing capacity parameters and if different flavors for one virtual machine are provided, the different flavors correspond to different sets of values of the processing capacity parameters, wherein the at least one flavor for one virtual machine is determined based on a predefined function which correlates the values of the processing capacity parameters with the partial application capacity provided by said one virtual machine.

3. The method according to claim 1, further determining a threshold application capacity for the virtual network function below which the application capacity provided by the needed virtual machines should not drop, wherein the needed virtual machines and the needed flavors are determined taking into account the determined threshold application capacity.

4. The method according to claim 3, further determining a fault tolerance value indicating a number of failed hosts, wherein when a number of hosts indicated by the fault tolerance value fail, the needed number of virtual machines minus the failed hosts should still provide the determined threshold application capacity, wherein the needed virtual machines and the needed flavors are determined in the iterative process taking into account the determined fault tolerance value.

5. The method according to claim 1, further comprising the step of determining a minimum and a maximum number of needed virtual machines, wherein the number of needed virtual machines is higher than or equal to the minimum number of virtual machines and lower than or equal to the maximum number of virtual machines, wherein the needed virtual machines and the needed flavors are determined in the iterative process taking into account the determined minimum and maximum number.

6. The method according to claim 1, further comprising the step of determining a minimum and a maximum application capacity for each of the plurality of virtual machines, wherein the partial application capacity provided by each of the plurality of virtual machines is higher than or equal to the minimum application capacity and lower than or equal to the maximum application capacity, wherein the needed virtual machines and the needed flavors are determined in the iterative process taking into account the determined minimum and maximum application capacity for each of the plurality of virtual machines.

7. The method according to claim 1, wherein a best flavor is determined for each of the plurality of virtual machines comprising more than one flavor, wherein the best flavor is the flavor providing the lowest ratio between the used processing capacity relative to the partial application capacity provided by the corresponding virtual machine, wherein the needed virtual machines and the needed flavors are determined in the iterative process taking into account the determined best flavor.

8. The method according to claim 1, wherein a best flavor is determined for each of the plurality of virtual machines comprising more than one flavor taking into account predefined requirements needed for providing the defined functional behavior of the virtualized network function.

9. The method according to claim 5, wherein when a number of needed virtual machines corresponds to the maximum number of virtual machines and the total application capacity is not yet reached, the flavor of at least one of the needed virtual machines having more than one flavor is increased in the iterative process until the total application capacity is reached.

10. The method according to claim 7 wherein the iterative process is started with selecting the virtual machines having a flavor close to the determined best flavor, and it is checked whether the total application capacity can be obtained with selecting the virtual machines from the plurality of virtual machines having a processing capacity close to the best flavor as needed virtual machines, wherein, when it is not possible to obtain the total application capacity only with the virtual machines with a flavor close to the best flavor, either the flavors of the needed virtual machines are amended or another virtual machine from the plurality of virtual machines having a flavor different from the best flavor is added to the needed virtual machines until the total application capacity is reached.

11. A managing entity configured to allocate a plurality of virtual machines provided on at least one host to a virtualized network function which provides a defined functional behavior in a network and requires a total application capacity for the functional behavior, the functional behavior being provided by needed virtual machines from the plurality of virtual machines, wherein each of the at least one host has an available processing capacity which can be assigned to the virtual machines provided on the corresponding host, and each of the plurality of virtual machines has at least one flavor which indicates a used processing capacity of the available processing capacity of the corresponding host and which corresponds to a partial application capacity of the total application capacity provided by the corresponding virtual machine, wherein the managing entity comprises a memory and at least one processor, the memory containing instructions executable by said at least one processor, wherein the managing entity is configured to:
- determine the total application capacity of the virtualized network function,
- determine, for each of the virtual machines, the at least one flavor taking into account the available processing capacity of the host on which the corresponding virtual machine is provided, and the corresponding at least one partial application capacity,
- determine the needed virtual machines from the plurality of virtual machines and needed flavors of the needed virtual machines that are required to provide the total application capacity, wherein determining the needed virtual machines and needed flavors comprises:
- performing an iterative process in which the needed virtual machines are dynamically determined from the plurality of virtual machines based on the total application capacity, and in which the needed flavor for each of the needed virtual machines is dynamically determined taking into account the total application capacity and the available processing capacity provided on the host on which the corresponding needed virtual machine is provided.

12. The managing entity according to claim 11, the used processing capacity of each of the plurality of virtual machines depends on a plurality of processing capacity parameters which depend on the available processing capacity provided by available processing resources of the host on which the corresponding virtual machine is provided, wherein one flavor for one virtual machine corresponds to a set of values of the processing capacity parameters and if different flavors for one virtual machine are provided, the different flavors correspond to different sets of values of the processing capacity parameters, wherein the managing entity is operative to determine the at least one flavor for one virtual machine based on a predefined function which correlates the values of the processing capacity parameters with the partial application capacity provided by said one virtual machine.

13. The managing entity according to claim 11, wherein the managing entity is operative to determine a threshold application capacity for the virtual network function below which the application capacity provided by the needed virtual machines should not drop, and to determine the needed virtual machines and the needed flavors taking into account the determined threshold application capacity.

14. The managing entity according to claim 13, wherein the managing entity is operative to determine a fault tolerance value indicating a number of failed hosts, wherein when a number of hosts indicated by the fault tolerance value fail, the needed number of virtual machines minus the failed hosts should still provide the determined threshold application capacity, and to determine in the iterative process the needed virtual machines and the needed flavors taking into account the determined fault tolerance value.

15. The managing entity according to claim 11, wherein the managing entity is operative to determine a minimum and a maximum number of needed virtual machines, wherein the number of needed virtual machines is higher than or equal to the minimum number of virtual machines and the lower than or equal to the maximum number of virtual machines, and to determine in the iterative process the needed virtual machines and the needed flavors taking into account the determined minimum and maximum number.

16. The managing entity according to claim 11, wherein the managing entity is operative to determine a minimum and a maximum application capacity for each of the plurality of virtual machines, wherein the partial application capacity provided by each of the plurality of virtual machines is higher than or equal to the minimum application capacity and lower than or equal to the maximum application capacity, and to determine in the iterative process the needed virtual machines and the needed flavors taking into account the determined minimum and maximum application capacity for each of the plurality of virtual machines.

17. The managing entity according to claim 11, wherein the managing entity is operative to determine a best flavor for each of the plurality of virtual machines comprising more than one flavor, wherein the best flavor is the flavor providing the lowest ratio between the used processing capacity relative to the partial application capacity provided by the corresponding virtual machine, and to determine in the iterative process the needed virtual machines and the needed flavors taking into account the determined best flavor.

18. The managing entity according to claim 11, wherein the managing entity is operative to determine a best flavor for each of the plurality of virtual machines comprising more than one flavor, taking into account predefined requirements needed for providing the defined functional behavior of the virtualized network function.

19. The managing entity according to claim 16, wherein the managing entity is operative to start the iterative process with selecting the virtual machines having a flavor close to the determined best flavor, and to check whether the total application capacity can be obtained with selecting the virtual machines from the plurality of virtual machines having a processing capacity close to the best flavor as needed virtual machines, wherein, when it is not possible to obtain the total application capacity only with the virtual machines with a flavor close to the best flavor, the managing entity is operative to either amend the flavors of the needed virtual machines or to add another virtual machine from the plurality of virtual machines having a flavor different from the best flavor to the needed virtual machines until the total application capacity is reached.

20. The managing entity according to claim 11 wherein the managing entity is operative to determine a maximum allocable partial application capacity defining a maximum partial application capacity allocated to one virtual machine during the iterative process, and to determine in the iterative process the needed virtual machines and the needed flavors taking into account the determined maximum allocable partial application capacity.

21. The managing entity according to claim 13, wherein the managing entity is operative to:
- determine a first value of the maximum allocable partial application capacity based on the total application capacity, the threshold application capacity and the fault tolerance value,
- determine a second value of the maximum allocable partial application capacity based on the total application capacity and the minimum number of virtual machines,
- determine a third value of the maximum allocable partial application capacity based on the total application capacity and based on the maximum application capacity available for the plurality of virtual machines,
- wherein the managing entity is operative to determine the maximum allocable partial application capacity such that it corresponds to the minimum of the three determined values.

22. The managing entity according to claim 20, wherein the managing entity is operative, before the iterative process is started, to check whether it is possible to provide the total application capacity using the maximum number of needed virtual machines with the maximum allocable partial application capacity, and to only start the iterative process if this is the case.

23. The managing entity according to claim 11, wherein the managing entity is operative, to increase the flavor of at least one of the needed virtual machines having more than one flavor in the iterative process until the total application capacity is reached, when a number of needed virtual machines corresponds to the maximum number of virtual machines and the total application capacity is not yet reached.

24. A computer program comprising program code to be executed by at least one processor of a managing entity, wherein execution of the program code causes the at least one processor to execute a method according to claim 1.

25. A carrier comprising the computer program of claim 24, wherein the carrier is one of an electronic signal, optical signal, radio signal, or computer readable storage medium.

* * * * *